US012800891B2

(12) United States Patent
Yamanaka

(10) Patent No.: US 12,800,891 B2
(45) Date of Patent: Nov. 17, 2026

(54) ZOOM LENS AND IMAGING APPARATUS

(71) Applicant: Tamron Co., Ltd., Saitama (JP)

(72) Inventor: Hisayuki Yamanaka, Saitama (JP)

(73) Assignee: TAMRON CO., LTD., Saitama (JP)

( * ) Notice: Subject to any disclaimer, the term of this patent is extended or adjusted under 35 U.S.C. 154(b) by 222 days.

(21) Appl. No.: 18/771,541

(22) Filed: Jul. 12, 2024

(65) Prior Publication Data

US 2025/0076623 A1 Mar. 6, 2025

(30) Foreign Application Priority Data

Aug. 29, 2023 (JP) ................................. 2023-139262

(51) Int. Cl.

| | |
|---|---|
| ***G02B 15/14*** | (2006.01) |
| ***G02B 13/00*** | (2006.01) |
| ***G02B 13/02*** | (2006.01) |
| ***G02B 13/06*** | (2006.01) |

(52) U.S. Cl.

CPC ... *G02B 15/145121* (2019.08); *G02B 13/009* (2013.01); *G02B 13/02* (2013.01); *G02B 13/06* (2013.01)

(58) Field of Classification Search

CPC .......... G02B 15/145121; G02B 13/009; G02B 13/02; G02B 13/06; G02B 15/1451; G02B 15/145105; G02B 15/173; G02B 15/20

See application file for complete search history.

(56) References Cited

U.S. PATENT DOCUMENTS

2014/0347525 A1* 11/2014 Obikane ........ G02B 15/145105 359/557
2019/0243111 A1 8/2019 Ito
2023/0112183 A1* 4/2023 Yonezawa ...... G02B 15/145113 359/676

FOREIGN PATENT DOCUMENTS

JP 2019-138941 A 8/2019
WO WO 2018/092295 A1 5/2018

* cited by examiner

*Primary Examiner* — Charles S Chang

(74) *Attorney, Agent, or Firm* — Paratus Law Group, PLLC

(57) ABSTRACT

There is provided a zoom lens configured to include an anterior group having negative refractive power as a whole and a posterior group having positive refractive power as a whole. In zooming from a wide-angle end to a telephoto end, five or less lens groups are moved to change intervals, and the zoom lens has specific optical characteristics represented by specific conditions.

12 Claims, 17 Drawing Sheets

ZOOM LENS AND IMAGING APPARATUS

CROSS-REFERENCE TO RELATED APPLICATIONS

This application is based on and claims the benefit of priority from Japanese Patent Application No. 2023-139262, filed on Aug. 29, 2023, the entire contents of which are incorporated herein by reference.

BACKGROUND OF THE INVENTION

Technical Field

The present invention relates to a zoom lens and an imaging apparatus.

Related Art

Imaging apparatuses using solid-state image sensors such as digital still cameras and digital video cameras are widely used. Examples of the imaging apparatuses include a digital still camera, a digital video camera, a broadcast camera, a monitoring camera, a vehicle-mounted camera, and the like. In any imaging apparatus, there is a strong market demand for a zoom lens having a high aperture ratio, a compact optical system, and high optical performance.

As an optical configuration of the zoom lens, for example, a positive lead configuration including a lens group having positive refractive power and being provided closest to an object side is known. In general, a positive lead zoom lens has a configuration in which strong negative refractive power is set in a second lens group at a second position from an object side, and a high zoom burden is imposed on the second lens group, so that it is easy to realize high-power zooming. Regarding the positive lead zoom lenses, there is a strong telephoto tendency, so that a total optical length can be shortened as compared with the focal length.

Among the zoom lenses, a zoom lens including, in order from an object side, a lens group having positive, negative, positive, negative, and positive refractive powers in which a fourth lens group is a focus group is known (see, for example, WO 2018/092295). In addition, among the zoom lenses, a zoom lens including, in order from an object side, a lens group having positive, negative, positive, negative, and positive refractive powers in which a second lens group is a focus group is known (see, for example, JP 2019-138941 A).

Here, in order to obtain a zoom lens having a small F value and high optical performance, it is necessary to satisfactorily correct various aberrations caused by a high aperture ratio. Therefore, in the zoom lens having a small F value, it is difficult to set strong refractive power in each lens group as compared with a zoom lens having a large F value, and a large optical system is likely to be formed. In addition, in order to obtain the zoom lens having a small F value, it is preferable to dispose a lens group having strong positive refractive power on an image plane side, that is, on a rear side of the optical system. However, when the lens group having strong positive refractive power is disposed on the rear side of the optical system, it is difficult to obtain a zoom lens having a strong telephoto tendency, and it is difficult to shorten a total optical length. As described above, in order to realize a zoom lens having high optical performance and a small size while achieving a high aperture ratio, it is necessary to suitably set power arrangement of lens groups, an imaging magnification, a lens configuration, a distance that each lens group is moved depending on zooming, or the like.

In the zoom lens described in WO 2018/092295, back focus is long, and an optical system is not reduced in size.

In the zoom lens described in JP 2019-138941 A, focusing by the second lens group is not suitable for quick focusing due to the large number of lenses and heavy weight. In addition, since the weight of the second lens group is heavy, a large drive mechanism for moving the second lens group at the time of focusing is increased in size. Therefore, a problem arises in that a lens barrel diameter is increased.

Objects of one aspect of the present invention are to provide a high-performance zoom lens and an imaging apparatus that have a high aperture ratio, are compact as a whole, and have various satisfactorily corrected aberrations.

SUMMARY OF THE INVENTION

In order to solve the above-described problem, there is provided a zoom lens according to one aspect of the present invention, the zoom lens including: a plurality of lens groups, in which when a lens group disposed on an object side from the widest air interval between lens groups at a wide-angle end is defined as an anterior group, and a lens group disposed on an image plane side from the air interval is defined as a posterior group, the anterior group is configured to include, in order from the object side, a lens group P having positive refractive power and a middle group M1 including one or more lens groups and having negative refractive power as a whole, and has negative refractive power as a whole, and the posterior group is configured to include, in order from the object side, a middle group M2 including one or more lens groups and having positive refractive power as a whole, a lens group F having negative refractive power as a whole, and a rear-side group R including one or more lens groups, and has positive refractive power as a whole, in zooming from the wide-angle end to a telephoto end, an interval between adjacent lens groups changes, five or less lens groups are moved to change intervals between adjacent lens groups, the lens group P is moved toward the object side, at least one lens group having the negative refractive power of the lens groups included in the middle group M1 is gradually moved toward the image plane side, and at least one lens group having positive refractive power of the lens groups included in the middle group M2 is moved along a convex trajectory toward the image plane side, the lens group F is moved along an optical axis of the zoom lens at a time of focusing, and the following conditions are satisfied.

$$0.5 \leq bfw/Yw \leq 1.4 \quad (1)$$

$$0.5 \leq fp/ft \leq 1.5 \quad (2)$$

$$-0.9 \leq fm1/fw \leq -0.15 \quad (3)$$

Where bfw is back focus of an optical system of the zoom lens at a wide-angle end, Yw is a maximum image height at the wide-angle end, fp is a focal length of the lens group P, ft is a focal length of an optical system of the zoom lens at a telephoto end, fm1 is a combined focal length of the middle group M1 at the wide-angle end, and fw is a focal length of the optical system of the zoom lens at the wide-angle end.

In addition, in order to solve the above-described problem, there is provided an imaging apparatus according to another aspect of the present invention, the imaging apparatus including: the zoom lens described above; and an image sensor that converts an optical image formed by the zoom lens into an electrical signal on an image plane side of the zoom lens.

According to the aspects of the present invention, there can be provided a high-performance zoom lens and an imaging apparatus that are compact as a whole and have various satisfactorily corrected aberrations.

DESCRIPTION OF THE EMBODIMENTS

Figure 1:
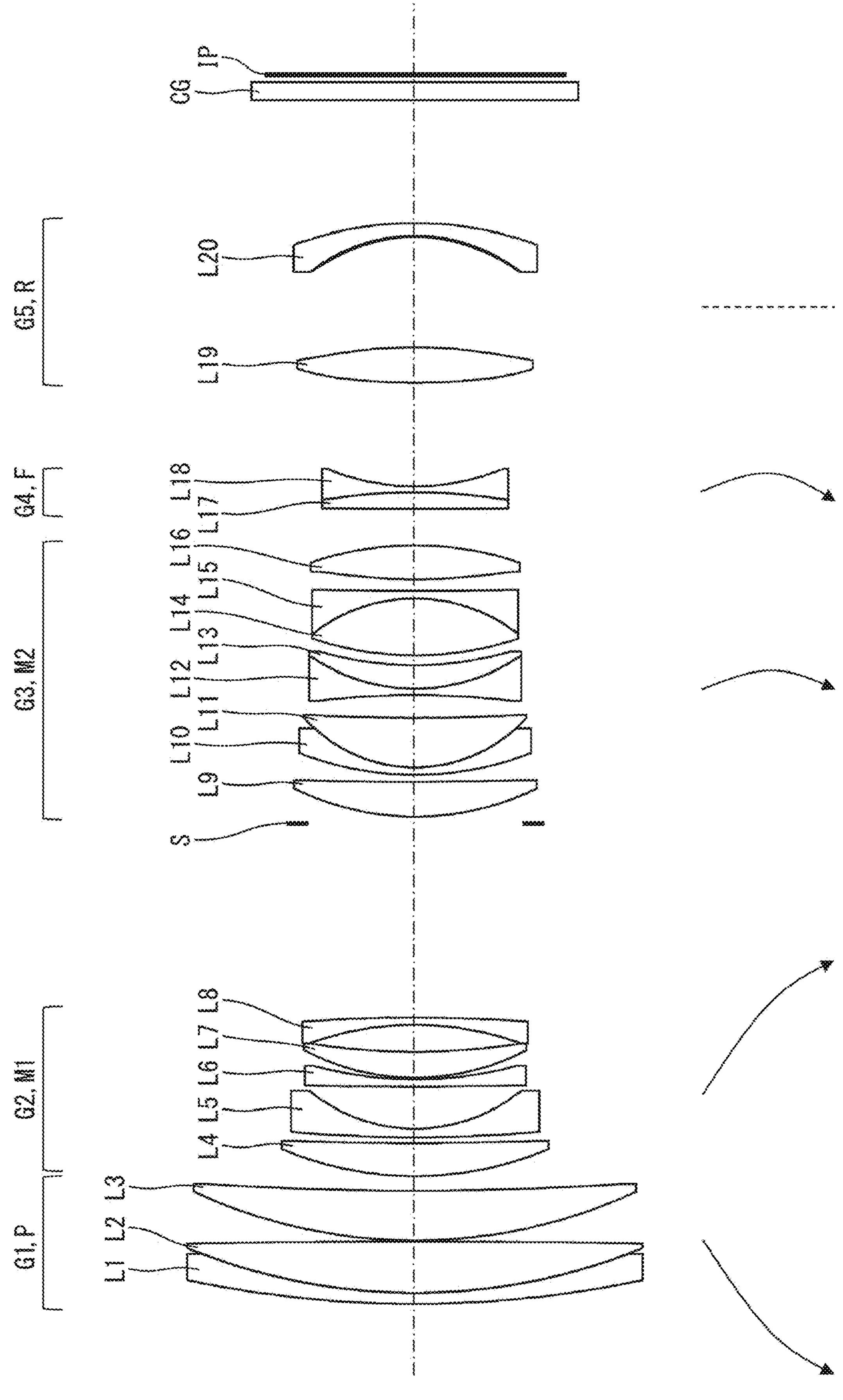
FIG. 1 is a lens cross-sectional view schematically illustrating an optical configuration at a wide-angle end of a zoom lens of Example 1.

Hereinafter, embodiments of a zoom lens and an imaging apparatus according to the present invention will be described. More specifically, the present embodiment relates to an imaging apparatus and a zoom lens suitable for the imaging apparatus using a solid-state image sensor (CCD, CMOS, or the like) such as a digital still camera or a digital video camera. However, each of the zoom lens and the imaging apparatus to be described below is one aspect of each of the zoom lens and the imaging apparatus according to the present invention, and the zoom lens and the imaging apparatus according to the present invention are not limited to the following aspects.

1. Zoom Lens

1-1. Optical Configuration

An optical configuration of a zoom lens according to an embodiment of the present invention will be described. The zoom lens of the present embodiment is a zoom lens including a plurality of lens groups and is configured to include an anterior group that is a set of two or more lens groups arranged on an object side from the widest air interval between the lens groups at a wide-angle end and a posterior group that is a set of three or more lens groups arranged on an image plane side from the air interval. The zoom lens does not include a lens group other than the lens groups included in the anterior group or the posterior group but may include an optical element that does not have substantial refractive power.

Note that, in the present specification, "lens group" means a set of one or more lenses that cooperate with each other in a zooming operation. The lenses in the lens group move while maintaining relative positional relationships in the zooming operation. The zooming operation is performed by changing intervals between lens groups, and intervals between lenses belonging to the same lens group do not change in the zooming operation.

In the present specification, "widest air interval between lens groups at a wide-angle end" refers to an interval between an apex of an image-plane-side lens surface of a lens closest to an image plane side which is included in one lens group and an apex of an object-side lens surface of a lens closest to an object side included in the other lens group of two adjacent lens groups.

Hereinafter, an optical configuration of the zoom lens will be further described.

(1) Anterior Group

The anterior group has negative refractive power as a whole. The anterior group is configured to include a lens group P and a middle group M1 in order from the object side.

The lens group P is disposed closest to the object side. The lens group P has positive refractive power as a whole, and a specific lens configuration thereof is not particularly limited. The lens group P can be configured to include, for example, two lenses having positive refractive power. This configuration is preferable from the viewpoint of increasing the positive refractive power in the lens group P. In addition, this configuration can enhance a telephoto tendency at a telephoto end while achieving a high zooming ratio and thus is preferable from the viewpoint of reducing a size of an optical system of the zoom lens. Note that a strong telephoto tendency indicates that a value of a telephoto ratio is a smaller value.

In the present specification, "optical system of a zoom lens" means an optical system including an optical element from a lens closest to the object side to a lens closest to the image plane side. The optical system of the zoom lens may further include an optical element beyond the above range and may or may not include an optical element that blocks light having a specific wavelength, such as a cover glass or an infrared cut filter of an image sensor. In addition, in the present specification, a distance from an object-side lens surface of a lens closest to an object side to an image plane on an optical axis of an optical system of a zoom lens is referred to as a "total optical length".

The lens group P preferably includes at least one lens having negative refractive power. This configuration facilitates correction of spherical aberration, chromatic aberration, or the like and thus is preferable from the viewpoint of realizing a zoom lens having good optical performance.

A middle group M1 is disposed on an image plane side of the lens group P in the anterior group. The middle group M1 may be one lens group or a set of two or more lens groups. The middle group M1 includes one or more lens groups and has negative refractive power as a whole.

Among the lens groups having negative refractive power which are included in the middle group M1, a lens group having the highest negative refractive power is referred to as a lens group N. A specific lens configuration of the lens group N is not particularly limited.

Other configurations of the middle group M1 are not particularly limited as long as the middle group M1 has the negative refractive power as a whole. For example, the middle group M1 may include one or more lens groups having the positive or negative refractive power in addition to the lens group N. This configuration is preferable from the viewpoint of realizing the zoom lens having good optical performance because field curvature and spherical aberration due to zooming are easily corrected. In addition, it is preferable that the middle group M1 have a convex lens closest to the object side. This configuration is preferable from the viewpoint of realizing a zoom lens having a small lens barrel diameter because a light beam height of an outermost light beam of an on-axis light flux incident on the middle group M2 and an aperture stop to be described below can be reduced.

The anterior group can be substantially configured only of the lens group P and the middle group M1. When the anterior group further includes a lens group other than those groups described above, the lens group is included in the middle group M1.

(2) Posterior Group

A posterior group has the positive refractive power as a whole. The posterior group is configured to include, in order from the object side, a middle group M2, a lens group F, and a rear-side group R.

The middle group M2 is disposed closest to the object side in the posterior group. The middle group M2 may be one lens group or a set of two or more lens groups. The middle group M2 is configured to include one or more lens groups and has the positive refractive power as a whole. A lens configuration or a lens group configuration of the middle group M2 can be appropriately determined in a range in which the middle group M2 has the positive refractive power as a whole.

The middle group M2 preferably has a convex lens closest to the most object side. This configuration is preferable from the viewpoint of realizing a compact zoom lens because it is easy to shorten the total optical length. In addition, this configuration is preferable from the viewpoint of reducing a size of a focus unit because it is easy to reduce a light beam height of an outermost light beam of an on-axis light flux and a peripheral light flux incident on the lens group F.

An image-plane-side lens surface of a lens closest to an image plane side of the middle group M2 is preferably a convex surface on the image plane side. This configuration is preferable from the viewpoint of realizing a bright zoom lens having a small F value.

From the viewpoint of reducing a size of a vibration-compensation drive mechanism, it is preferable that the middle group M2 include a vibration-compensation group V having the negative refractive power and moving in a direction orthogonal to the optical axis. The vibration-compensation group V may be configured of a plurality of lenses, but it is preferable that the vibration-compensation group V be configured of one single lens or one cemented lens. This configuration is preferable from the viewpoint of reducing weight and a size of the vibration-compensation group V.

In the case where the middle group M2 includes the vibration-compensation group V, the middle group M2 may include one or more lenses on each of the object side from the vibration-compensation group V and the image plane side from the vibration-compensation group V. In this case, it is preferable that one or more lenses disposed on the object side from the vibration-compensation group V in the middle group M2 have the positive refractive power as a whole, and one or more lenses disposed on the image plane side from the vibration-compensation group V in the middle group M2 have the positive refractive power as a whole. This configuration is preferable from the viewpoint of reducing a size of the vibration-compensation group.

The lens group F is a lens group disposed on the image plane side of the middle group M2 in the posterior group. The lens group F has the negative refractive power as a whole.

The lens group F has the negative refractive power as a whole, and a specific lens configuration thereof is not particularly limited. More preferably, it is preferable to have at least one lens having the positive refractive power and at least one lens having the negative refractive power. This configuration is preferable from the viewpoint of obtaining the high-performance zoom lens in which various aberrations such as spherical aberration and chromatic aberration are satisfactorily corrected over an entire object distance.

It is particularly preferable that the lens group F be configured to include only a cemented lens obtained by cementing one lens having the positive refractive power and one lens having the negative refractive power. This configuration is preferable from the viewpoint of realizing high-speed autofocus by reducing weight of a focus group.

The lens group F is disposed on the image plane side from the middle group M2 and is disposed relatively rearward in the optical system of the zoom lens. This configuration is preferable from the viewpoint of reducing a lens diameter of the lens group F and the viewpoint of reducing the weight of the lens group F because light flux converged by the middle group M2 is incident on the lens group F from the object side.

The rear-side group R is disposed on the image plane side from the lens group F in the posterior group. The rear-side group R has at least one or more lens group and more specifically may be one lens group or a set of two or more lens groups. The refractive power of the rear-side group R as a whole is not particularly limited. For example, the rear-side group R may be configured to have the positive refractive power as a whole. This configuration is preferable from the viewpoint of reducing the F value of the optical system of the zoom lens. On the other hand, the rear-side group R may be configured to have the negative refractive power as a whole. This configuration is preferable from the viewpoint of shortening a total optical length at a telephoto end because it becomes easy to obtain the zoom lens having a stronger telephoto tendency at the telephoto end.

The rear-side group R may include two or more lens groups in a range in which effects of the present embodiment can be obtained. The rear-side group R may be one lens group from the viewpoint of shortening the total optical length. The rear-side group R may include two or more lens groups from the viewpoint of satisfactorily correcting the field curvature in an entire zoom region.

(3) Aperture Stop

The zoom lens may include an aperture stop. The aperture stop may be disposed on the object side of the middle group M2 to be adjacent to the middle group M2 or may be disposed inside the middle group M2. A configuration in which the aperture stop is disposed adjacent to the object side of the middle group M2 enables an entrance pupil position to be disposed closer to the object side as compared with the case where the aperture stop is disposed inside the middle group M2. Therefore, it is preferable from the viewpoint of easily reducing a diameter of the peripheral light flux passing through the lens group P at the telephoto end and easily reducing the front lens diameter. Note that the front lens is a lens disposed closest to the object side among the lenses included in the optical system of the zoom lens.

The aperture stop may be disposed inside the middle group M2. This configuration is preferable from the viewpoint of reducing a size of an aperture mechanism because an aperture diameter can be reduced by a convergence action of the positive refractive power by the middle group M2.

1-2. Operation (1) Zooming

In zooming from the wide-angle end to the telephoto end or from the telephoto end to the wide-angle end, the zoom lens performs the zooming by changing the air interval of the adjacent lens groups on the optical axis. In particular, in zooming from the wide-angle end to the telephoto end, an air interval between the anterior group and the posterior group, that is, an air interval between the middle group M1 and the middle group M2, is changed to be decreased.

In zooming, five or less lens groups are moved to change intervals between adjacent lens groups. The number of lens groups that are moved during zooming is preferably within the above-described range from the viewpoint of reducing the lens barrel diameter because a mechanism for moving the lens groups can be simplified.

In zooming from the wide-angle end to the telephoto end, the lens group P is moved toward the object side. This operation is preferable from the viewpoint of realizing the compact zoom lens having a short total optical length at the wide-angle end. In zooming, the operation of lens group P is not particularly limited. For example, in zooming from the wide-angle end to the telephoto end, the lens group P may be gradually moved toward the object side. In the present specification, "being gradually moved" means that a lens group is moved in one direction. Gradual movement is also referred to as monotonic movement in this technical field.

In zooming from the wide-angle end to the telephoto end, at least one lens group having the negative refractive power among the lens groups included in the middle group M1 is gradually moved toward the image plane side. This operation is preferable from the viewpoint of realizing the zoom lens having a small lens barrel diameter because a light beam height of an outermost light beam of an on-axis light flux incident on the middle group M2 and the aperture stop can be reduced. In addition, this operation is preferable from the viewpoint of shortening the total optical length at the telephoto end since it is easy to reduce the telephoto ratio.

In zooming from the wide-angle end to the telephoto end, at least one lens group having the positive refractive power among the lens groups included in the middle group M2 is moved along a convex trajectory toward the image plane side. That is, in zooming from the wide-angle end to the telephoto end, the lens group is moved toward the object side after being moved toward the image plane side. In addition, in zooming from the telephoto end to the wide-angle end, the lens group is moved toward the image plane side and then is further moved toward the object side. This operation is preferable from the viewpoint of obtaining the zoom lens having high optical performance because it is easy to satisfactorily correct the field curvature in the entire zoom region.

In zooming from the wide-angle end to the telephoto end, it is preferable that the lens group F is moved along a convex trajectory toward the image plane side. This operation is preferable because variations in a focus image plane due to the zooming can be suppressed, and it is easy to satisfactorily correct the field curvature in the entire zoom region.

The rear-side group R preferably is not moved during zooming. In the zoom lens, the rear-side group R disposed closest to the image plane side is defined as a fixed lens group, and thereby a lens barrel can have a sealed structure or the like on the image plane side thereof. Hence, this is preferable from the viewpoint of forming a dustproof structure and a waterproof structure. In addition, by forming the rear-side group R as the fixed lens group, there is no need to provide a cam structure for moving the rear-side group R, and a simple lens barrel structure can be obtained. Hence, this is preferable from the viewpoint of reducing a size of the lens barrel and improving the manufacturability.

(2) Focusing

In focusing the zoom lens, the lens group F is moved along the optical axis of the zoom lens. By using the lens group F as a focus group, high-speed autofocus can be realized. Hence, this is preferable from the viewpoint of reducing a load of a focus drive system. In addition, by using the lens group F as the focus group, it is possible to suppress variations in an angle of view due to the moving of the focus group. Therefore, not only in a case of employing a contrast AF method but also in a case of employing an image plane phase difference AF method, it is possible to obtain the zoom lens suitable for imaging a video or the like by using a tracking AF function. Note that, since a lateral magnification of the lens group F takes a value larger than 1, the lens group F is moved toward the image plane side when focusing is performed from infinity to a near object.

In focusing the zoom lens, in addition to the lens group F, a lens group different from the lens group F or a part of the lens group may be moved. For example, a so-called floating focus system may be employed. This configuration is preferable from the viewpoint of obtaining the high-performance zoom lens because aberration correction for a near object becomes easy. On the other hand, from the viewpoint of reducing a size of and weight of the lens barrel, in the zoom lens, it is particularly preferable that only the lens group F be moved at the time of focusing.

1-3. Expressions

The zoom lens desirably employs the above-described configuration and satisfies at least one or more of the following conditions.

1-3-1. Expression (1)

$$0.5 \leq bfw/Yw \leq 1.4 \quad (1)$$

Where bfw: Back focus of optical system of zoom lens at wide-angle end

Yw is a maximum image height at the wide-angle end,

Expression (1) is an expression for appropriately defining a ratio of the back focus of the optical system of the zoom lens at the wide-angle end to the maximum image height of the zoom lens at the wide-angle end. Here, in a case where the optical system of the zoom lens includes a cover glass, the back focus bfw is calculated with a thickness of the cover glass as an air-converted distance. It is preferable that Expression (1) be satisfied, from the viewpoint of reducing a total length because the back focus of the zoom lens at the wide-angle end is shortened.

When bfw/Yw is lower than a lower limit in Expression (1), the back focus of the zoom lens at the wide-angle end becomes too short, and an inclination angle of an incident angle on an imaging surface with respect to the optical axis becomes too large. Here, on the imaging surface of the image sensor, a condenser lens such as an on-chip microlens for efficiently receiving an incident angle is provided in each pixel, and a light receiving angle of the on-chip microlens or the like is limited within a predetermined range. Therefore, if an emission angle from the zoom lens becomes too large, a problem of significant limb darkening (shading) due to mismatch with the on-chip microlens arises. On the other hand, when bfw/Yw is higher than the upper limit in Expression (1), the back focus of the zoom lens at the wide-angle end becomes too long, and it may be difficult to reduce the total length of the zoom lens.

From the viewpoint of reducing the total length, bfw/Yw is preferably 0.55 or higher, more preferably 0.60 or higher, still more preferably 0.65 or higher, and still more preferably 0.70 or higher. In addition, from the viewpoint of reducing the total length of the zoom lens, bfw/Yw is preferably 1.35 or lower, more preferably 1.3 or lower, and still more preferably 1.25 or lower.

1-3-2. Expression (2)

$$0.5 \leq fp/ft \leq 1.5 \quad (2)$$

fp: Focal length of lens group P ft: Focal length of optical system of zoom lens at telephoto end Expression (2) is an expression for appropriately defining a ratio of the focal length of the lens group P to the focal length of the optical system of the zoom lens at the telephoto end. It is preferable that Expression (2) be satisfied, from the viewpoint of realizing the compact zoom lens having a small telephoto ratio because the focal length of the lens group P falls within an appropriate range with respect to the focal length of the optical system of the zoom lens at the telephoto end. In addition, it is preferable that Expression (2) be satisfied, from the viewpoint of realizing the zoom lens having high optical performance in which spherical aberration and axial chromatic aberration can be more satisfactorily corrected since the focal length of the lens group P falls within the appropriate range.

When fp/ft is lower than the lower limit in Expression (2), the refractive power of the lens group P may become too strong with respect to the focal length of the optical system of the zoom lens at the telephoto end. In this case, it is difficult to satisfactorily correct the spherical aberration and the axial chromatic aberration, and it may be difficult to realize the zoom lens having the high optical performance. On the other hand, when fp/ft is higher than the upper limit in Expression (2), the refractive power of the lens group P may become too weak with respect to the focal length of the optical system of the zoom lens at the telephoto end. In this case, the total optical length at the telephoto end becomes long, and it may be difficult to realize the compact zoom lens having a low telephoto ratio.

From the viewpoint of satisfactorily correcting the spherical aberration and the axial chromatic aberration, fp/ft is preferably 1.3 or lower, more preferably 1.2 or lower, still more preferably 1.1 or lower, and still more preferably 1.0 or lower. In addition, from the viewpoint of realizing the compact zoom lens having a small telephoto ratio, fp/ft is preferably 0.55 or higher, more preferably 0.60 or higher, still more preferably 0.65 or higher, and still more preferably 0.70 or higher.

1-3-3. Expression (3)

$$-0.9 \leq fm1/fw \leq -1.5 \quad (3)$$

fm1: Combined focal length of middle group M1 at wide-angle end fw: Focal length of optical system of zoom lens at wide-angle end Expression (3) is an expression for appropriately defining a ratio of the combined focal length of the middle group M1 at the wide-angle end to the focal length of the optical system of the zoom lens at the wide-angle end. By satisfying Expression (3), the combined focal length of the middle group M1 at the wide-angle end falls within an appropriate range with respect to the focal length of the optical system of the zoom lens at the wide-angle end, and it is possible to more satisfactorily correct the field curvature that is likely to be formed at the wide-angle end. Therefore, this is preferable from the viewpoint of realizing the zoom lens having the high optical performance in the entire zoom region. In the present specification, the "combined focal length" of the lens group refers to a focal length of the entire lens group including one or more lenses.

When fm1/fw is lower than the lower limit in Expression (3), the refractive power of the entire middle group M1 at the wide-angle end is small with respect to the focal length of the optical system of the zoom lens at the wide-angle end. In this case, since it is difficult to reduce the telephoto ratio, it may be difficult to obtain a compact zoom lens having a short total optical length. On the other hand, when fm1/fw is higher than the upper limit in Expression (3), the refractive power of the entire middle group M1 at the wide-angle end is large with respect to the focal length of the optical system of the zoom lens at the wide-angle end. In this case, the field curvature is likely to be formed at the wide-angle end, and it may be difficult to realize the zoom lens having the high optical performance in the entire zoom region.

From the viewpoint of satisfactorily correcting the field curvature and realizing the zoom lens having the high optical performance, fm1/fw is preferably −0.20 or lower, more preferably −0.25 or lower, still more preferably −0.30 or lower, and still more preferably −0.35 or lower. In addition, from the viewpoint of obtaining the compact zoom lens having the short total optical length, fm1/fw is preferably −0.85 or higher, more preferably −0.80 or higher, still more preferably −0.75 or higher, and still more preferably −0.70 or higher.

1-3-4. Expression (4)

$$0.05 \leq Dm/Tw \leq 0.20 \tag{4}$$

Dm: Distance between middle group M1 and middle group M2 at wide-angle end on optical axis Tw: Total optical length at wide-angle end Expression (4) is an expression for appropriately defining a ratio of the distances between the middle group M1 and the middle group M2 at the wide-angle end on the optical axes to the total optical length at the wide-angle end. Here, in the case where the optical system of the zoom lens includes the cover glass, the total optical length Tw is calculated with a thickness of the cover glass as an air-converted distance. It is preferable that Expression (4) be satisfied, from the viewpoint of realizing the zoom lens having a short total length at the wide-angle end because the distance between the middle group M1 and the middle group M2 at the wide-angle end on the optical axis falls within an appropriate range with respect to the total optical length at the wide-angle end.

When Dm/Tw is lower than the lower limit in Expression (4), the distance between the middle group M1 and the middle group M2 at the wide-angle end on the optical axis may be too short with respect to the total optical length at the wide-angle end. In this case, it is difficult to sufficiently ensure the amount of moving of the middle group M1 due to the zooming, and thus it is necessary to increase a space in which the lens group P can be moved in order to ensure a desired zooming ratio. As a result, since the total optical length at the telephoto end becomes long, it may be difficult to obtain a compact zoom lens having a small telephoto ratio. When Dm/Tw is higher than the upper limit in Expression (4), the distance between the middle group M1 and the middle group M2 at the wide-angle end on the optical axis becomes longer than the total optical length at the wide-angle end, and it may be difficult to obtain the zoom lens having a short total length at the wide-angle end. In addition, when Dm/Tw is higher than the upper limit in Expression (4), the light beam height of the outermost light beam of the on-axis light flux incident on the middle group M2 and the aperture stop is likely to increase, and it may be difficult to reduce the lens barrel diameter.

From the viewpoint of reducing the size, Dm/Tw is preferably 0.195 or lower, more preferably 0.19 or lower, still more preferably 1.85 or lower, and still more preferably 0.18 or lower. In addition, from the viewpoint of the compact zoom lens having a small telephoto ratio, Dm/Tw is preferably 0.06 or higher, more preferably 0.07 or higher, still more preferably 0.08 or higher, and still more preferably 0.09 or higher.

1-3-5. Expression (5)

$$0.5 \leq |Xp|/|Xn| \leq 2.0 \tag{5}$$

Xp: Distance between position of lens group P at wide-angle end and position of lens group P at telephoto end on optical axis Xn: Distance between position of lens group N at wide-angle end and position of lens group N at telephoto end on optical axis Expression (5) is an expression for appropriately defining a ratio of the distance between the position of the lens group P at the wide-angle end and the position of the lens group P at the telephoto end on the optical axis to the distance between the position of the lens group N at the wide-angle end and the position of the lens group N at the telephoto end on the optical axis. That is, Expression (5) defines a relationship of the distances that each of the lens group N and the lens group P is moved from the wide-angle end to the telephoto end in zooming.

It is preferable that Expression (5) be satisfied, from the viewpoint of realizing a compact zoom lens having a short total length at the telephoto end and a small lens barrel diameter because the ratio of the distance that the lens group P is moved to the distance that the lens group N is moved due to zooming falls within an appropriate range.

When |Xp|/|Xn| is lower than the lower limit in Expression (5), the distance that the lens group P is moved during zooming may become too small with respect to the distance that the lens group N is moved during zooming. In this case, it is necessary to increase the distance that the lens group N is moved in order to obtain a desired zooming ratio. In order to increase the distance that the lens group N is moved, it is necessary to increase the air interval on the optical axis between the middle group M1 and the middle group M2 at the wide-angle end. As a result, the total optical length at the wide-angle end becomes long, and it may be difficult to obtain a zoom lens having a short total length. When |Xp|/|Xn| is higher than the upper limit in Expression (5), the distance that the lens group P is moved during zooming may become too long with respect to the distance that the lens group N is moved during zooming. In this case, it is difficult to shorten the total optical length at the telephoto end, and thus it may be difficult to obtain a compact zoom lens having a small telephoto ratio.

From the viewpoint of obtaining the compact zoom lens having a small telephoto ratio, |Xp|/|Xn| is preferably 1.9 or lower, more preferably 1.8 or lower, still more preferably 1.7 or lower, and still more preferably 1.5 or lower. In addition, from the viewpoint of obtaining the zoom lens having a short total length, |Xp|/|Xn| is preferably 0.55 or higher, more preferably 0.60 or higher, still more preferably 0.65 or higher, and still more preferably 0.70 or higher.

1-3-6. Expression (6)

$$1.5 \leq \left|\{1-(\beta ft)^2\}\times(\beta rt)^2\right| \leq 9.5 \quad (6)$$

βft: Lateral magnification of lens group F at telephoto end at the time of infinity focusing βrt: Lateral magnification of rear-side group R at telephoto end at the time of infinity focusing Expression (6) represents a ratio of a distance that a focus plane is moved to a distance that the lens group F is moved and is an expression for setting the position sensitivity of the lens group F within an appropriate range. It is preferable that Expression (6) be satisfied, from the viewpoint of optimizing the driving accuracy at the time of focusing and optimizing the distance that the lens group is moved at the time of focusing.

When $|\{1-(\beta ft)^2\}\times(\beta rt)^2|$ is lower than the lower limit in Expression (6), the distance that the lens group F is moved at the time of focusing increases, and thus a focus actuator for driving the lens group F may result in an increase in size. In this case, it may be difficult to realize a compact zoom lens. When $|\{1-(\beta ft)^2\}\times(\beta rt)^2|$ is higher than the upper limit in Expression (6), the position sensitivity of the lens group F becomes too high, the necessary driving accuracy of focusing becomes high, and it may be difficult to improve focusing accuracy.

From the viewpoint of improving the focusing accuracy, $|\{1-(\beta ft)^2\}\times(\beta rt)^2|$ is preferably 9.0 or lower, more preferably 8.5 or lower, still more preferably 8.0 or lower, and still more preferably 7.5 or lower. In addition, from the viewpoint of reducing a size of the zoom lens, $|\{1-(\beta ft)^2\}\times(\beta rt)^2|$ is preferably 1.7 or higher, more preferably 1.9 or higher, still more preferably 2.1 or higher, and still more preferably 2.3 or higher.

1-3-7 Expression (7)

$$0.7 \leq fm2p/fm2 \leq 2.0 \quad (7)$$

fm2p: Combined focal length of all lenses at telephoto end which are arranged on object side from vibration-compensation group V in middle group M2 fm2: Combined focal length of middle group M2 at telephoto end

Expression (7) is an expression for appropriately defining a ratio of the combined focal length of all the lenses at the telephoto end which are arranged on the object side from the vibration-compensation group V in the middle group M2 to the combined focal length of the middle group M2 at the telephoto end. It is preferable that Expression (7) be satisfied, from the viewpoint of suppressing an increase in size of the vibration-compensation drive mechanism because a light beam height of an outermost light beam of an on-axis light flux incident on the vibration-compensation group V is reduced.

When fm2p/fm2 is lower than the lower limit in Expression (7), the refractive power of all the lenses at the telephoto end which are arranged on the object side from the vibration-compensation group V in the middle group M2 may become too strong with respect to the combined focal length of the middle group M2 at the telephoto end. In this case, it may be difficult to satisfactorily correct the spherical aberration and the axial chromatic aberration. When fm2p/fm2 is higher than the upper limit in Expression (7), it is difficult to reduce the light beam height of the outermost light beam of the on-axis light flux incident on the vibration-compensation group V, and the vibration-compensation drive mechanism may be increased in size.

From the viewpoint of reducing a size of the vibration-compensation drive mechanism, fm2p/fm2 is preferably 1.9 or lower, more preferably 1.8 or lower, still more preferably 1.7 or lower, and still more preferably 1.6 or lower. In addition, from the viewpoint of satisfactorily correcting the spherical aberration and the axial chromatic aberration, fm2p/fm2 is preferably 0.8 or higher, more preferably 0.9 or higher, still more preferably 1.0 or higher, and still more preferably 1.1 or higher.

1-3-8 Expression (8)

$$-3.3 \leq fm2v/fm2 \leq -1.2 \quad (8)$$

fm2v: Focal length of vibration-compensation group V

Expression (8) is an expression for appropriately defining a ratio of the focal length of the vibration-compensation group V to the combined focal length of the middle group M2 at the telephoto end. It is preferable that Expression (8) be satisfied, from the viewpoint of suppressing the aberration occurring at the time of vibration-compensation while a drive width of the vibration-compensation group V at the time of vibration-compensation is suppressed within an appropriate range.

When fm2v/fm2 is lower than the lower limit in Expression (8), the drive width of the vibration-compensation group V for blur correction becomes small, and thus it is advantageous to reduce a size of the vibration-compensation drive mechanism, but it may be difficult to correct the spherical aberration and the astigmatism at the time of vibration-compensation. On the other hand, when fm2v/fm2 is higher than the upper limit in Expression (8), the drive width of the vibration-compensation group V for blur correction is increased, so that the vibration-compensation drive mechanism is increased in size, and it may be difficult to reduce the size of the optical system of the zoom lens.

From the viewpoint of reducing a size of the zoom lens, fm2v/fm2 is preferably −1.3 or lower, more preferably −1.4 or lower, still more preferably −1.5 or lower, and still more preferably −1.6 or lower. In addition, from the viewpoint of correcting the spherical aberration and the astigmatism at the time of vibration-compensation, fm2v/fm2 is preferably −3.2 or higher, more preferably −3.0 or higher, still more preferably −2.9 or higher, and still more preferably −2.8 or higher.

2. Imaging Apparatus

Next, the imaging apparatus according to an embodiment of the present invention will be described. The imaging apparatus includes the zoom lens according to the present embodiment described above and an image sensor that is provided on the image plane side of the zoom lens and converts an optical image formed by the zoom lens into an electrical signal.

Here, the image sensor is not limited, and a solid-state image sensor such as a charge coupled device (CCD) sensor or a complementary metal oxide semiconductor (CMOS)

sensor can be used as the image sensor, and a silver salt film, an infrared cut filter (IRCF), or the like can also be used. The imaging apparatus according to the present embodiment is suitable for an imaging apparatus using the above-described solid-state image sensor, such as a digital camera and a video camera. In addition, the imaging apparatus may be a lens fixed type imaging apparatus in which a lens is fixed to a housing or may be a lens interchangeable type imaging apparatus such as a single lens reflex camera and a mirrorless camera. In particular, the zoom lens according to the present embodiment can ensure back focus suitable for the interchangeable lens system. Therefore, the present invention is suitable for an imaging apparatus such as a single lens reflex camera including an optical finder, a phase difference sensor, a reflex mirror for branching light to the finder and sensor, and the like.

Figure 17:
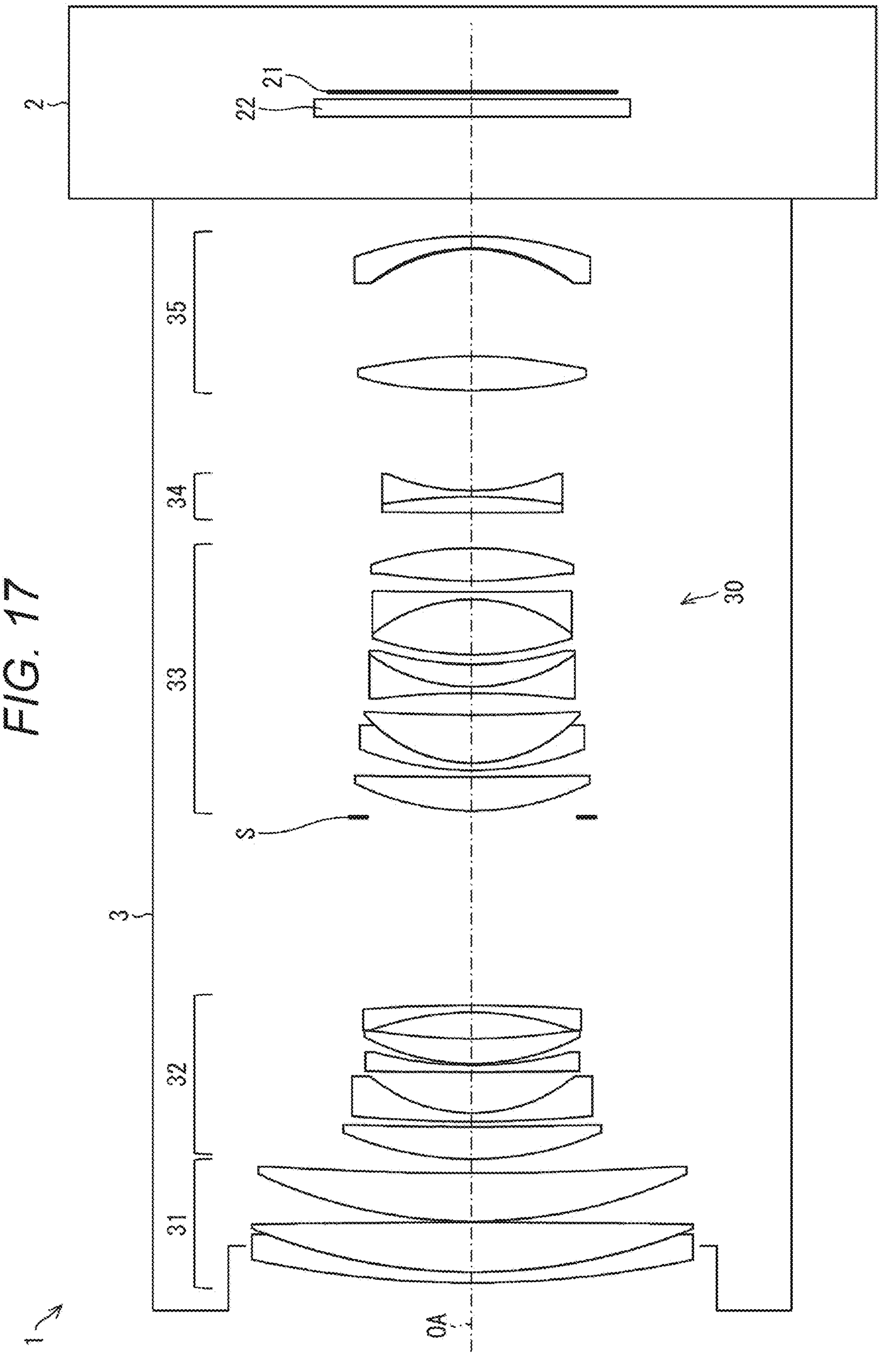
FIG. 17 is a view schematically illustrating an example of a configuration of an imaging apparatus according to an embodiment of the present invention.

FIG. 17 is a view schematically illustrating an example of a configuration of the imaging apparatus according to the present embodiment. As illustrated in FIG. 17, a mirrorless camera 1 includes a main body 2 and a lens barrel 3 detachably provided to the main body 2. The mirrorless camera 1 is an aspect of the imaging apparatus.

The lens barrel 3 includes a zoom lens 30. The zoom lens 30 includes a first lens group 31, a second lens group 32, a third lens group 33, a fourth lens group 34, and a fifth lens group 35. The zoom lens 30 is configured to satisfy, for example, Expressions (1) to (3) described above. A stop S is disposed on the object side of the third lens group 33.

The first lens group 31 has the positive refractive power as a whole and corresponds to the above-described lens group P. The second lens group 32 has the negative refractive power as a whole and corresponds to the above-described middle group M1. The third lens group 33 has the positive refractive power as a whole and corresponds to the above-described middle group M2. The fourth lens group 34 has the negative refractive power as a whole and corresponds to the above-described lens group F. The fifth lens group 35 has the negative refractive power as a whole and corresponds to the above-described rear-side group R.

The main body 2 includes a CCD sensor 21 as an image sensor and a cover glass 22. The CCD sensor 21 is disposed in the main body 2 at a position where an optical axis QA of the zoom lens 30 in the lens barrel 3 attached to the main body 2 is a central axis. The main body 2 may have a parallel flat plate having no substantial refractive power, such as an infrared cut filter (IRCF), instead of the cover glass 22.

Since the mirrorless camera 1 includes the zoom lens 30, it is possible to capture a high-quality image in which various aberrations are satisfactorily corrected, even in a small size as a whole.

The present invention is not limited to the above-described embodiments and can be modified in various manners within the scope of the claims. Embodiments obtained by combining as appropriate technical means disclosed in relation to different embodiments are also included in the technical scope of the present invention.

SUMMARY

The zoom lens according to Aspect 1 of the present invention includes: a plurality of lens groups. When a lens group disposed on the object side from the widest air interval between lens groups at the wide-angle end is defined as the anterior group, and a lens group disposed on the image plane side from the air interval is defined as the posterior group, the anterior group is configured to include, in order from the object side, the lens group P having the positive refractive power and the middle group M1 including one or more lens groups and having the negative refractive power as a whole, and has the negative refractive power as a whole, and the posterior group is configured to include, in order from the object side, the middle group M2 including one or more lens groups and having the positive refractive power as a whole, the lens group F having the negative refractive power as a whole, and the rear-side group R including one or more lens groups, and has the positive refractive power as a whole. In zooming from the wide-angle end to the telephoto end, an interval between adjacent lens groups changes, five or less lens groups are moved to change intervals between adjacent lens groups, the lens group P is moved toward the object side, at least one lens group having the negative refractive power of the lens groups included in the middle group M1 is gradually moved toward the image plane side, and at least one lens group having the positive refractive power of the lens groups included in the middle group M2 is moved along a convex trajectory toward the image plane side. The lens group F is moved along the optical axis of the zoom lens at the time of focusing. The following conditions are satisfied.

$$0.5 \le bfw/Yw \le 1.4 \tag{1}$$

$$0.5 \le fp/ft \le 1.5 \tag{2}$$

$$-0.9 \le fm1/fw \le -0.15 \tag{3}$$

Where bfw is back focus of an optical system of the zoom lens at a wide-angle end, Yw is a maximum image height at the wide-angle end, fp: Focal length of lens group P ft is a focal length of an optical system of the zoom lens at a telephoto end, fm1: Combined focal length of middle group M1 at wide-angle end fw is a focal length of the optical system of the zoom lens at the wide-angle end.

The zoom lens of Aspect 2 of the present invention according to Aspect 1 satisfies the following expression.

$$0.05 \le Dm/Tw \le 0.20 \tag{4}$$

Dm: Distance between middle group M1 and middle group M2 at wide-angle end on optical axis Tw: Total optical length at wide-angle end The zoom lens of Aspect 3 of the present invention according to Aspect 1 or 2 satisfies the following expression, when a lens group having the largest negative refractive power among the lens groups having the negative refractive power included in the middle group M1 is defined as the lens group N.

$$0.5 \le |Xp|/|Xn| \le 2.0 \tag{5}$$

Xp: Distance between position of lens group P at wide-angle end and position of lens group P at telephoto end on optical axis Xn: Distance between position of lens group N at wide-angle end and position of lens group N at telephoto end on optical axis The zoom lens of Aspect 4 of the present invention according to any one of Aspects 1 to 3 satisfies the following expression.

$$1.5 \le \left|\left\{1-(\beta ft)^2\right\}\times(\beta rt)^2\right| \le 9.5 \quad (6)$$

βft: Lateral magnification of lens group F at telephoto end at the time of infinity focusing βrt: Lateral magnification of rear-side group R at telephoto end at the time of infinity focusing In the zoom lens of Aspect 5 of the present invention according to any one of Aspects 1 to 4, the lens group F is moved along a convex trajectory toward the image plane side during zooming from the wide-angle end to the telephoto end.

In the zoom lens of Aspect 6 of the present invention according to any one of Aspects 1 to 5, the middle group M2 includes the vibration-compensation group V which has the negative refractive power and is moved in the direction orthogonal to the optical axis.

In the zoom lens of Aspect 7 of the present invention according to Aspect 6, the middle group M2 includes one or more lenses both on the object side from the vibration-compensation group V and on the image plane side from the vibration-compensation group V, the lenses arranged on the object side from the vibration-compensation group V in the middle group M2 have the positive refractive power as a whole, and the lenses arranged on the image plane side from the vibration-compensation group V in the middle group M2 have the positive refractive power as a whole.

The zoom lens of Aspect 8 of the present invention according to Aspect 7 satisfies the following expression.

$$0.7 \le fm2p/fm2 \le 2.0 \quad (7)$$

fm2p: Combined focal length of all lenses at telephoto end which are arranged on object side from vibration-compensation group V in middle group M2 fm2: Combined focal length of middle group M2 at telephoto end

The zoom lens of Aspect 9 of the present invention according to Aspect 7 or 8 satisfies the following expression.

$$-3.3 \le fm2v/fm2 \le -1.2 \quad (8)$$

fm2v: Focal length of vibration-compensation group V fm2: Combined focal length of middle group M2 at telephoto end In the zoom lens of Aspect 10 of the present invention according to any one of Aspects 1 to 9, the middle group M1 has a convex lens closest to the object side.

In the zoom lens of Aspect 11 of the present invention according to any one of Aspects 1 to 10, the rear-side group R is not moved during zooming.

In the zoom lens of Aspect 12 of the present invention according to any one of Aspects 1 to 11, the lens group F includes at least one lens having the positive refractive power and at least one lens having the negative refractive power.

The imaging apparatus according to Aspect 13 of the present invention includes: the zoom lens according to any one of Aspects 1 to 12; and the image sensor that converts an optical image formed by the zoom lens into an electrical signal on the image plane side of the zoom lens.

EXAMPLES

An example of the present invention will be described below. Unless otherwise specified in the following tables, units of lengths are all "mm", units of angles of view are all "°", and "E+a" indicates "$\times 10^{a}$".

Example 1

FIG. 1 is a view schematically illustrating an optical configuration of the zoom lens of Example 1 at the wide-angle end at the time of infinity focusing. The zoom lens according to Example 1 includes, in order from the object side, a first lens group G1 having the positive refractive power, a second lens group G2 having the negative refractive power, a third lens group G3 having the positive refractive power, a fourth lens group G4 having the negative refractive power, and a fifth lens group G5 having the negative refractive power. The first lens group G1 and the second lens group G2 correspond to the above-described anterior group, and the third lens group G3, the fourth lens group G4, and the fifth lens group G5 correspond to the above-described posterior group. The first lens group G1 corresponds to the above-described lens group P. The second lens group G2 corresponds to the above-described middle group M1. In addition, the second lens group G2 corresponds to the above-described lens group N. The third lens group G3 corresponds to the above-described middle group M2. The fourth lens group G4 corresponds to the above-described lens group F. The fifth lens group G5 corresponds to the above-described rear-side group R.

In addition, "IP" illustrated in FIG. 1 represents a CCD sensor. In addition, a cover glass CG is disposed between the fifth lens group G5 and the CCD sensor IP. These are the same in the drawings schematically illustrating the optical configuration illustrated in the other examples, and thus the description thereof will be omitted below.

In Example 1, the zoom lens performs zooming by changing air intervals between adjacent lens groups on the optical axis. The same applies to the following examples.

An arrow in FIG. 1 represents a moving direction and a moving manner of each lens group in zooming from the wide-angle end to the telephoto end. As illustrated in FIG. 1, in zooming from the wide-angle end to the telephoto end, the first lens group G1 is gradually moved toward the object side, the second lens group G2 is gradually moved toward the image plane side, the third lens group G3 is moved along a convex trajectory toward the image plane side, and the fourth lens group G4 is moved along a convex trajectory toward the image plane side. The fifth lens group G5 is not moved.

In the zoom lens, the fourth lens group G4 is moved toward the image plane side to perform focusing from an infinite-distance object to a near object.

An aperture stop S is disposed adjacent to the object side of the third lens group G3.

Hereinafter, configurations of the lens groups will be described. The first lens group G1 is configured to include, in order from the object side, a cemented lens of a negative meniscus lens L1 and a biconvex lens L2 which both have convex surfaces facing the object side, and a positive meniscus lens L3 which has a convex surface facing the object side. Note that the negative meniscus lens is a lens having the negative refractive power, and the positive meniscus lens is a lens having the positive refractive power.

The second lens group G2 is configured to include, in order from the object side, a positive meniscus lens L4 which has a convex surface facing the object side, a negative meniscus lens L5 which has a convex surface facing the object side, a negative meniscus lens L6 which has a convex surface facing the object side, a positive meniscus lens L7 which has a convex surface facing the object side, and a negative meniscus lens L8 which has a concave surface facing the object side.

The third lens group G3 is configured to include, in order from the object side, a positive meniscus lens L9 which has a convex surface facing the object side, a cemented lens of a negative meniscus lens L10 which has a convex surface facing the object side and a positive meniscus lens L11 which has a convex surface facing the object side, a cemented lens of a biconcave lens L12 and a positive meniscus lens L13 which has a convex surface facing the object side, a cemented lens of a biconvex lens L14 and a biconcave lens L15, and a biconvex lens L16. The biconvex lens L16 is a molded glass aspheric lens having both surfaces in an aspheric shape. Here, the cemented lens of the biconcave lens L12 and the positive meniscus lens L13 corresponds to the above-described vibration-compensation group V.

The fourth lens group G4 is configured of a cemented lens of a biconvex lens L17 and a biconcave lens L18.

The fifth lens group G5 is configured to include, in order from the object side, a biconvex lens L19 and a negative meniscus lens L20 which has a concave surface facing the object side. The negative meniscus lens L20 is a molded composite resin aspheric lens in which a composite resin film molded in an aspheric shape is attached to an object-side surface thereof.

Next, numerical-value examples to which specific numerical values of the zoom lens are applied will be described. Table 1 shows surface data of the zoom lens.

In the table of the surface data in Examples of the present invention, "No." represents an order of the lens surfaces counted from the object side, "r" represents the radius of curvature of the lens surface, "d" represents an interval of the lens surfaces on the optical axis, and "Nd" represents a refractive index with respect to a d beam (wavelength λ=587.56 nm). In addition, "νd" represents the Abbe number with respect to the d beam (wavelength λ=587.56 nm), and "ASPH" shown in the next column of the surface numbers represents that a corresponding lens surface is an aspheric surface. Further, "d(0)", "d(5)", and the like in the column of "d" mean that intervals of the lens surfaces on the optical axis are variable intervals that change at the time of zooming or focusing.

In Table 1, Nos. 1 to 5 are surface numbers of the first lens group G1. Nos. 6 to 15 are surface numbers of the second lens group G2. Nos. 16 to 29 are surface numbers of the third lens group G3. Nos. 30 to 32 are surface numbers of the fourth lens group G4. Nos. 33 to 37 are surface numbers of the fifth lens group G5. Nos. 38 and 39 are surface numbers of the cover glass CG.

TABLE 1

| No. | r | d | nd | νd |
|---|---|---|---|---|
| Object surface | ∞ | d (0) | | |
| 1 | 155.5198 | 1.5000 | 1.80610 | 33.27 |
| 2 | 83.6531 | 7.1965 | 1.49700 | 81.61 |
| 3 | −1844.7834 | 0.2000 | | |
| 4 | 73.3988 | 6.9834 | 1.43700 | 95.10 |
| 5 | 461.0825 | d (5) | | |
| 6 | 47.5905 | 4.6723 | 1.85883 | 30.00 |
| 7 | 579.8823 | 0.7769 | | |
| 8 | 195.9849 | 1.2000 | 1.75500 | 52.32 |
| 9 | 23.4952 | 5.8813 | | |
| 10 | 952.5687 | 1.0000 | 1.72916 | 54.67 |
| 11 | 54.2303 | 0.2000 | | |
| 12 | 33.1087 | 3.6676 | 1.84666 | 23.78 |
| 13 | 92.4947 | 3.7917 | | |
| 14 | −42.6220 | 1.0000 | 2.00069 | 25.46 |
| 15 | −206.1433 | d (15) | | |
| 16 S | ∞ | 1.0000 | | |
| 17 | 38.5110 | 4.9076 | 1.74330 | 49.22 |
| 18 | 745.9337 | 0.9873 | | |
| 19 | 44.9383 | 1.0000 | 2.00069 | 25.46 |
| 20 | 20.7729 | 6.9899 | 1.59282 | 68.62 |
| 21 | 320.7119 | 3.1443 | | |
| 22 | −110.5390 | 0.9000 | 1.61266 | 44.46 |
| 23 | 26.1970 | 3.2065 | 1.85451 | 25.15 |
| 24 | 46.4599 | 1.3500 | | |
| 25 | 43.7334 | 8.0145 | 1.59282 | 68.62 |
| 26 | −23.4024 | 1.1000 | 1.87070 | 40.73 |
| 27 | 876.6337 | 1.5574 | | |
| 28 ASPH | 68.9746 | 4.7794 | 1.85108 | 40.12 |
| 29 ASPH | −46.2047 | d (29) | | |
| 30 | 1529.6006 | 2.3821 | 1.92286 | 20.88 |
| 31 | −77.7371 | 0.8000 | 1.72916 | 54.67 |
| 32 | 31.7386 | d (32) | | |
| 33 ASPH | 107.0583 | 4.9111 | 1.58313 | 59.46 |
| 34 ASPH | −62.3810 | 15.4427 | | |
| 35 ASPH | −22.0000 | 0.2000 | 1.53610 | 41.21 |
| 36 | −24.0197 | 1.7000 | 1.90366 | 31.31 |
| 37 | −49.6800 | d (37) | | |
| 38 | ∞ | 2.5000 | 1.51680 | 64.20 |
| 39 | ∞ | 1.0000 | | |
| Image plane | ∞ | | | |

Table 2 shows a specification table of the zoom lens of Example 1. In the specification table, "f" represents a focal length of the corresponding zoom lens at the time of infinity focusing, "Fno" represents an F value, "ω" represents a half angle of view, and "Y" represents a maximum image height.

TABLE 2

| | Wide-angle end | Middle | Telephoto end |
|---|---|---|---|
| f | 72.0664 | 120.0114 | 174.6514 |
| FNo. | 2.9104 | 2.9109 | 2.9103 |
| ω | 16.3157 | 9.7406 | 6.7314 |
| Y | 21.6330 | 21.6330 | 21.6330 |

Table 3 shows distances of variable intervals at infinite-distance objects. In the table, the unit of distance is mm. Table 4 shows distances of the variable intervals at an imaging distance of 850 mm. In the table, the unit of distance is mm.

TABLE 3

| | Wide-angle end | Middle | Telephoto end |
|---|---|---|---|
| d (0) | ∞ | ∞ | ∞ |
| d (5) | 2.0014 | 35.8998 | 53.1842 |
| d (15) | 27.1298 | 12.8263 | 2.0000 |
| d (29) | 5.1074 | 5.4809 | 2.4998 |
| d (32) | 14.5385 | 11.6183 | 16.9614 |
| d (37) | 17.2805 | 17.2805 | 17.2805 |

TABLE 4

| | Wide-angle end | Middle | Telephoto end |
|---|---|---|---|
| d (0) | 678.0000 | 660.9517 | 652.1316 |
| d (5) | 2.0014 | 35.8998 | 53.1842 |
| d (15) | 27.1298 | 12.8263 | 2.0000 |
| d (29) | 7.3781 | 11.9435 | 15.1740 |
| d (32) | 12.2679 | 5.1557 | 4.2873 |
| d (37) | 17.2805 | 17.2805 | 17.2805 |

Table 5 is a table showing focal lengths of the lens groups constituting the zoom lens according to Example 1. In the table, the unit of distance is mm.

TABLE 5

| Group No. | Focal length |
|---|---|
| G1 | 148.1010 |
| G2 | −40.9089 |
| G3 | 35.8420 |
| G4 | −50.4269 |
| G5 | −727.7090 |

Table 6 shows aspheric coefficients of aspheric surfaces in the zoom lens of Example 1. An aspheric coefficient in the table is a value when each aspheric shape is defined by the following Expression (1)

[Mathematical Expression 1]

$$X = \frac{H^2/r}{1+\sqrt{1-(1+k)(H/r)^2}} + A_4H^4 + A_6H^6 + A_8H^8 + A_{10}H^{10} + A_{12}H^{12} \quad (1)$$

In the above expression, "X" is a displacement amount of an aspheric surface in an optical axis direction from a reference surface perpendicular to the optical axis, and "H" is a height (distance) from the optical axis to the aspheric surface in a direction perpendicular to the optical axis. In addition, "r" is paraxial radius of curvature of the lens surface, "k" is a conic constant (conic coefficient), and "An" (n is an integer) is an n-th order aspheric coefficient.

TABLE 6

| No. | k | A4 | A6 |
|---|---|---|---|
| 28 | 0.0000 | −6.97969E−06 | −2.19527E−09 |
| 29 | 0.0000 | 2.77578E−07 | −6.55276E−09 |
| 33 | 0.0000 | 7.58265E−06 | −7.72695E−09 |
| 34 | 0.0000 | 4.65516E−06 | −1.27998E−08 |
| 35 | 0.0000 | 1.14513E−05 | 1.27410E−09 |

| No. | A8 | A10 | A12 |
|---|---|---|---|
| 28 | 1.07027E−11 | −4.77707E−14 | 0.00000E+00 |
| 29 | 9.34354E−12 | −4.50201E−14 | 0.00000E+00 |
| 33 | 8.97112E−11 | −1.49928E−13 | 0.00000E+00 |
| 34 | 1.10482E−10 | −2.02070E−13 | 0.00000E+00 |
| 35 | 6.82309E−11 | −1.12878E−13 | 0.00000E+00 |

Figure 2:
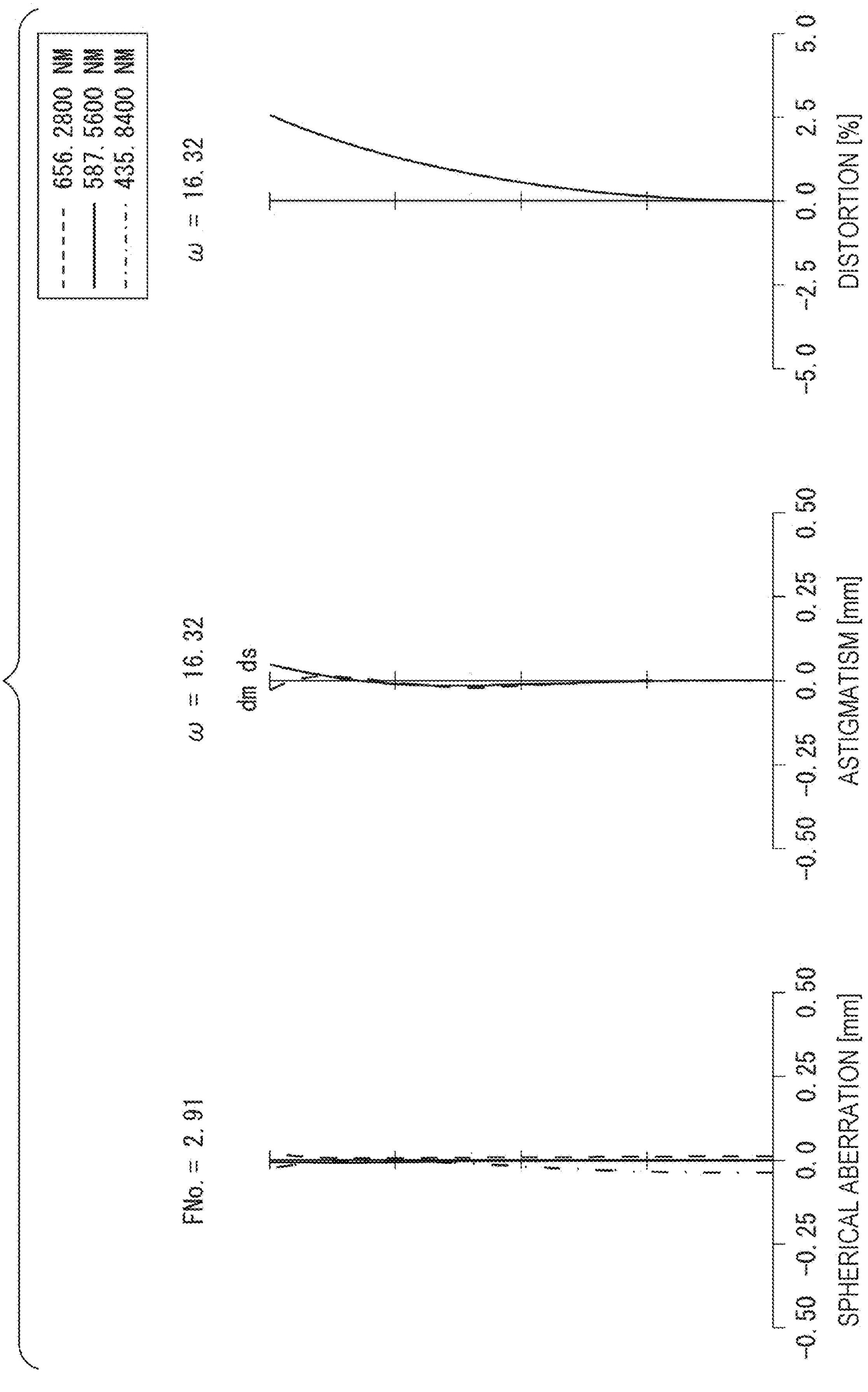
FIG. 2 illustrates a spherical aberration diagram, an astigmatism diagram, and a distortion diagram at the time of infinity focusing in a wide-angle end state of the zoom lens of Example 1.
Figure 3:
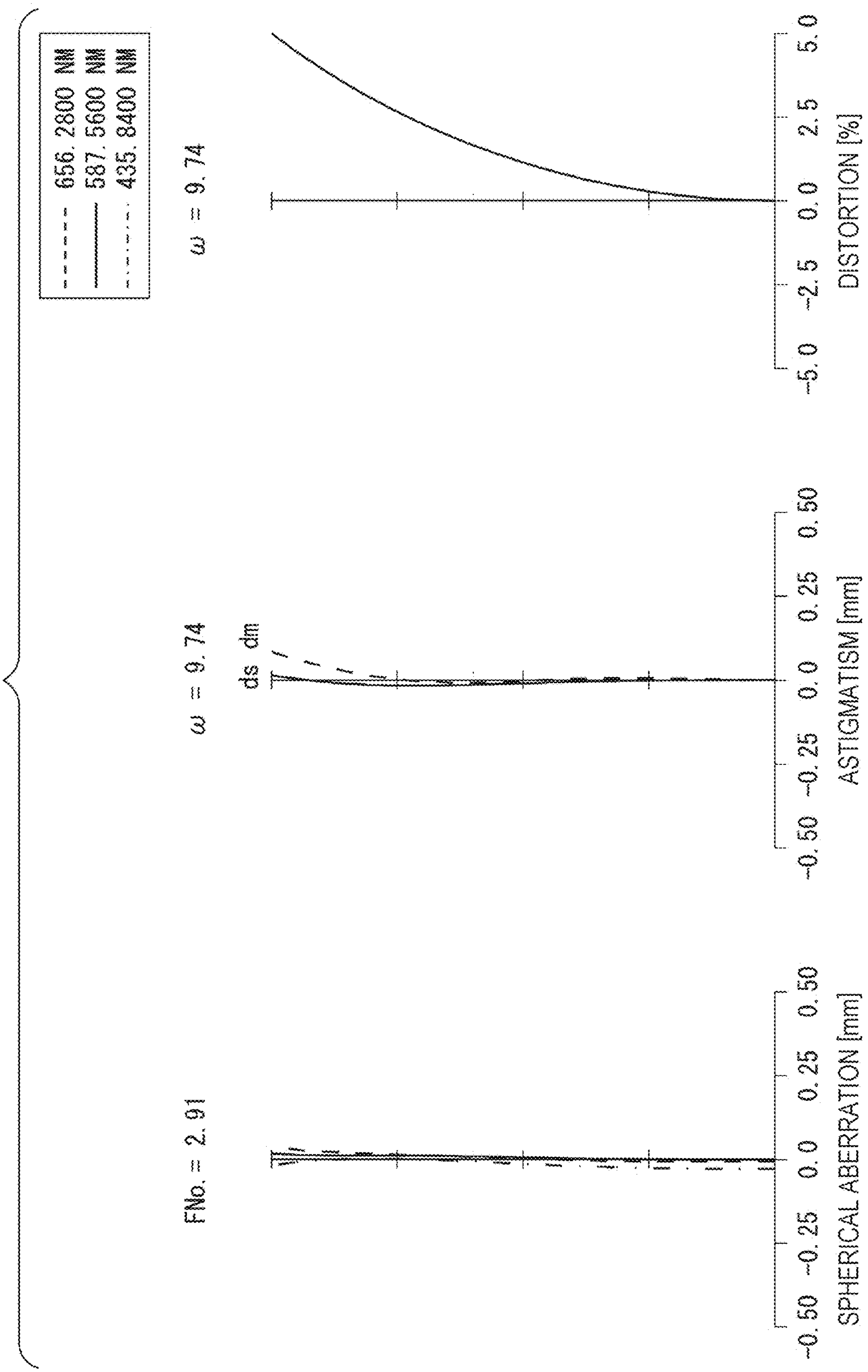
FIG. 3 illustrates a spherical aberration diagram, an astigmatism diagram, and a distortion diagram at the time of infinity focusing in an intermediate focal length state of the zoom lens of Example 1.
Figure 4:
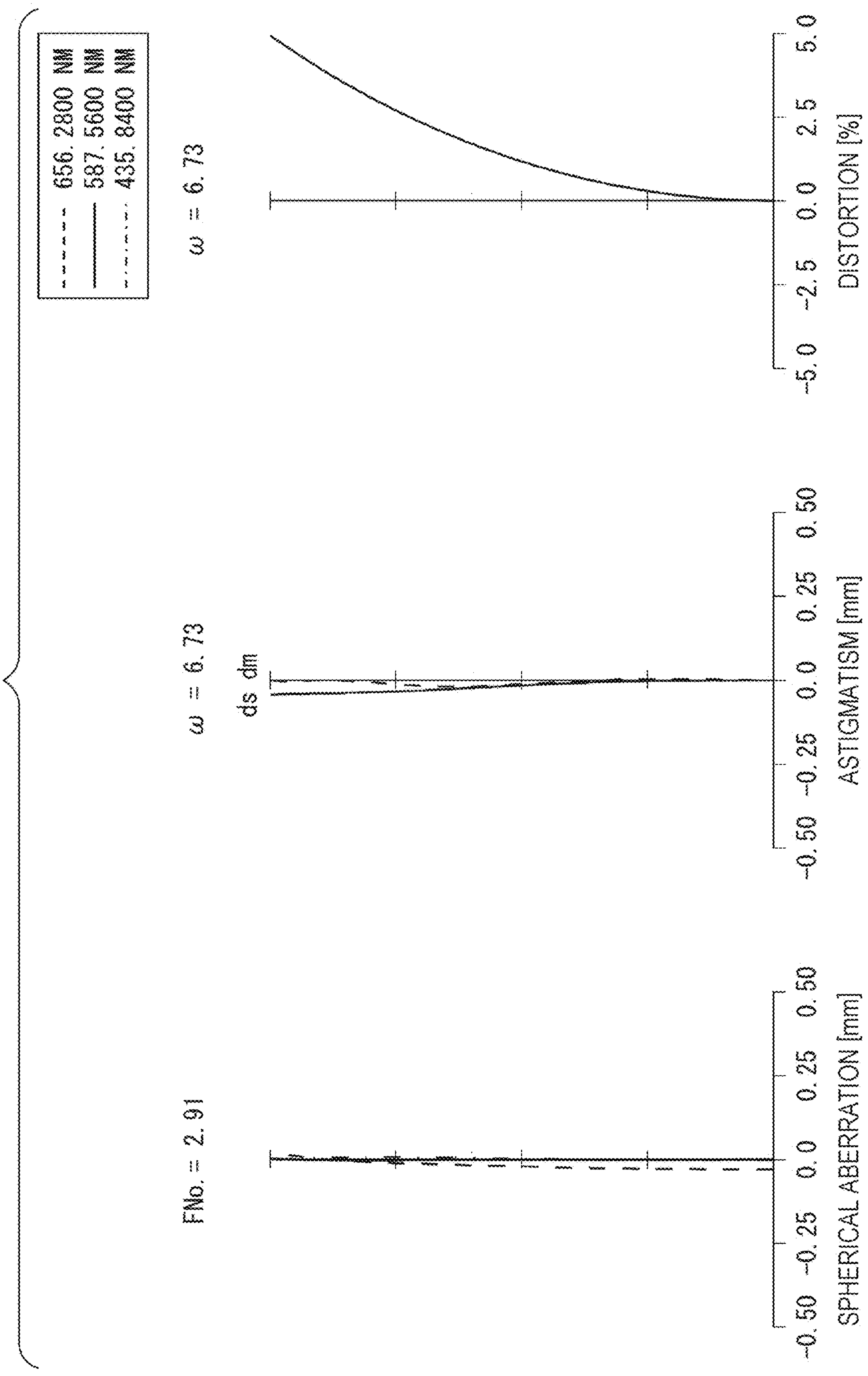
FIG. 4 illustrates a spherical aberration diagram, an astigmatism diagram, and a distortion diagram at the time of infinity focusing in a telephoto end state of the zoom lens of Example 1.

In addition, FIGS. 2, 3, and 4 are diagrams illustrating longitudinal aberration diagrams of the zoom lens according to Example 1 at the time of infinity focusing at the wide-angle end, the middle distance state, and the telephoto end, respectively. The longitudinal aberration diagrams in the drawings illustrate spherical aberration (mm), astigmatism (mm), and distortion (%) in this order from the left side. The same applies to other Examples.

In the diagrams illustrating the spherical aberration, the vertical axis represents the F value, and the horizontal axis represents defocus. In the diagrams illustrating the spherical aberration, a solid line represents the spherical aberration with the d beam (wavelength λ=587.56 nm), a chain line represents the spherical aberration with a g beam (wavelength λ=435.84 nm), and a broken line represents the spherical aberration with a C beam (wavelength λ=656.28 nm).

In the diagrams illustrating the astigmatism, the vertical axis represents a half angle of view, and the horizontal axis represents defocus. In the diagram illustrating the astigmatism, a solid line represents a sagittal image plane (ds) with respect to the d beam, and a broken line represents a meridional image plane (dm) with respect to the d beam.

In the diagrams illustrating the distortion, the vertical axis represents the half angle of view, and the horizontal axis represents %.

Example 2

Figure 5:
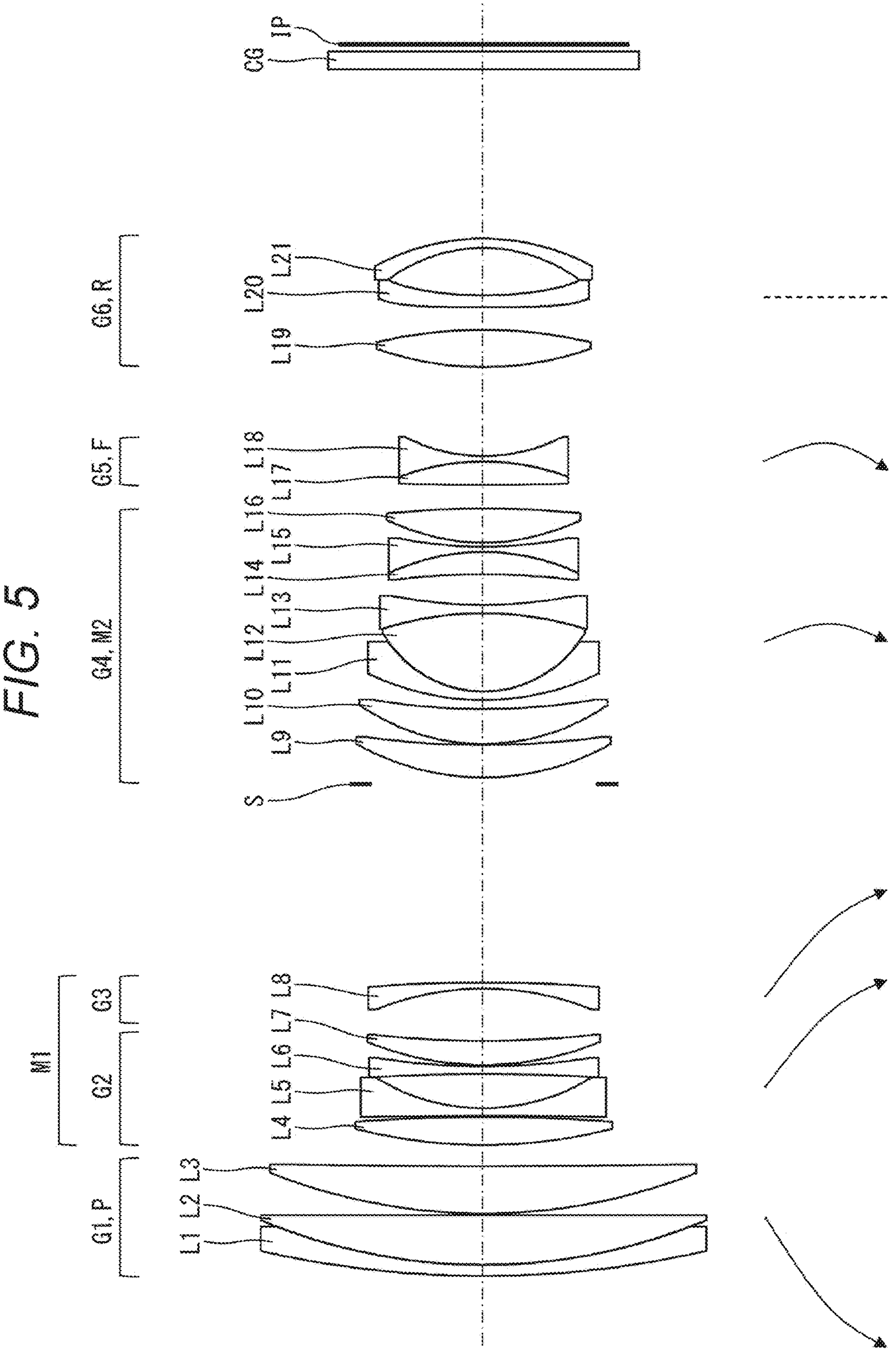
FIG. 5 is a lens cross-sectional view schematically illustrating an optical configuration at a wide-angle end of a zoom lens of Example 2.
Figure 6:
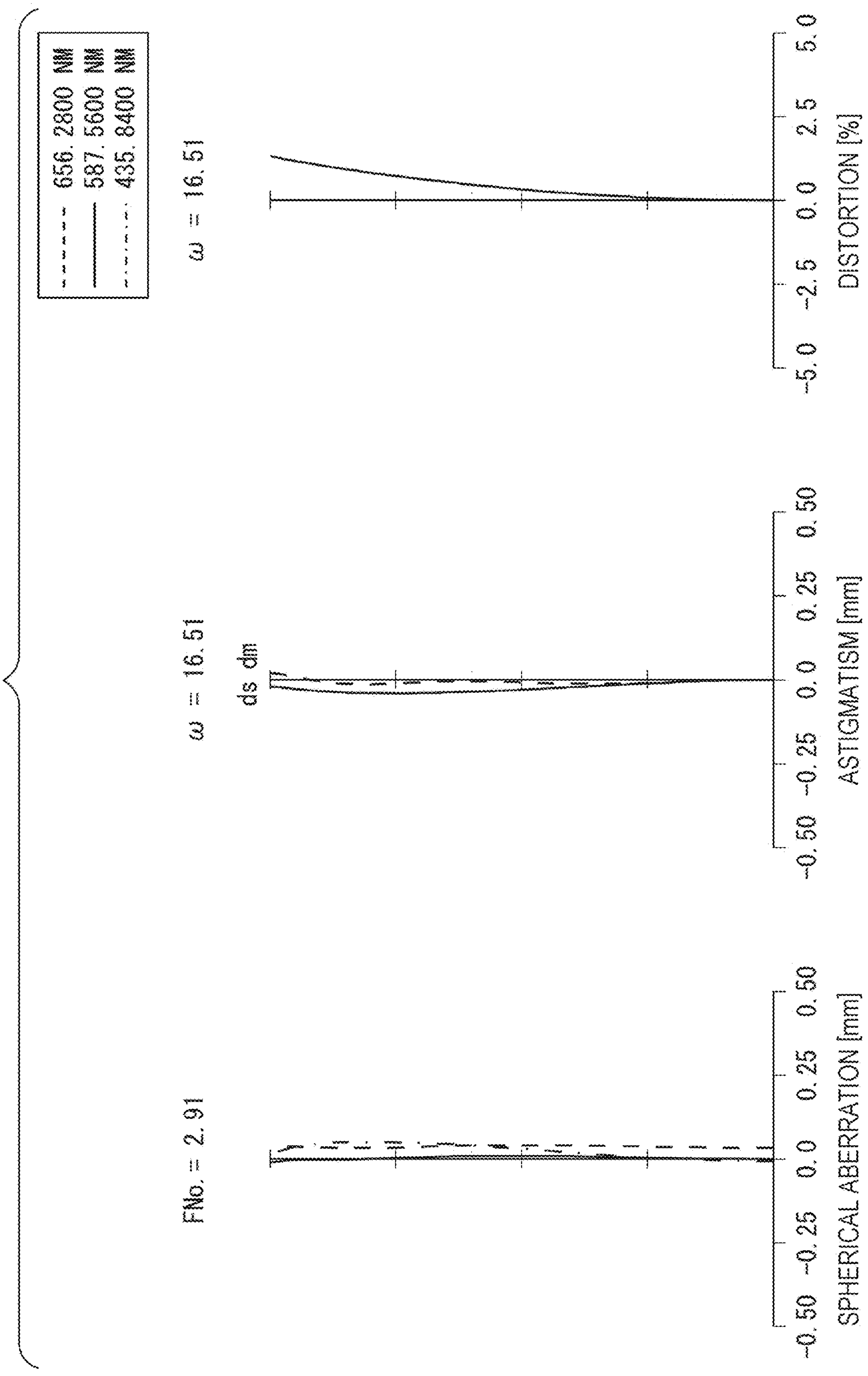
FIG. 6 illustrates a spherical aberration diagram, an astigmatism diagram, and a distortion diagram at the time of infinity focusing in a wide-angle end state of the zoom lens of Example 2.
Figure 7:
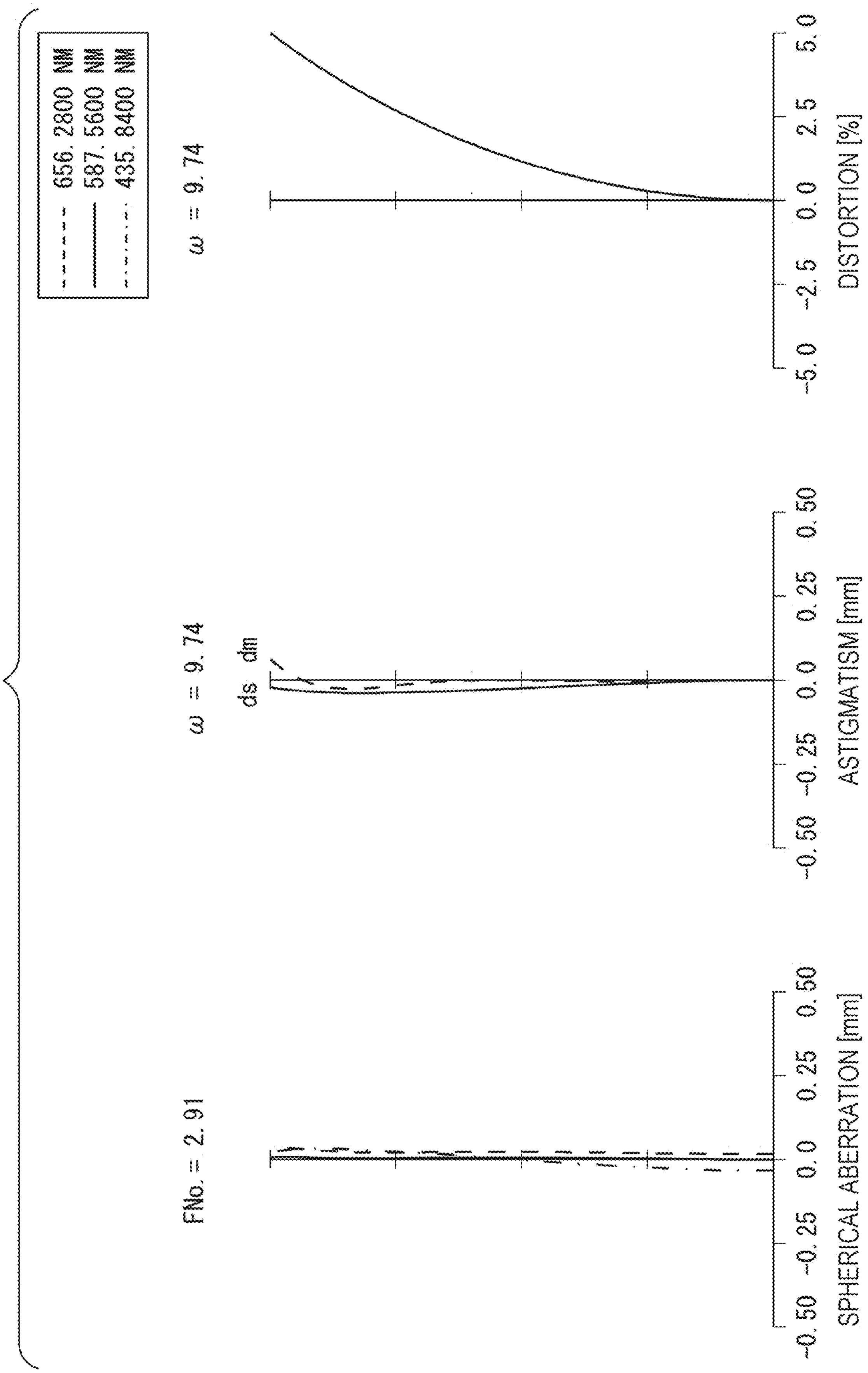
FIG. 7 illustrates a spherical aberration diagram, an astigmatism diagram, and a distortion diagram at the time of infinity focusing in an intermediate focal length state of the zoom lens of Example 2.
Figure 8:
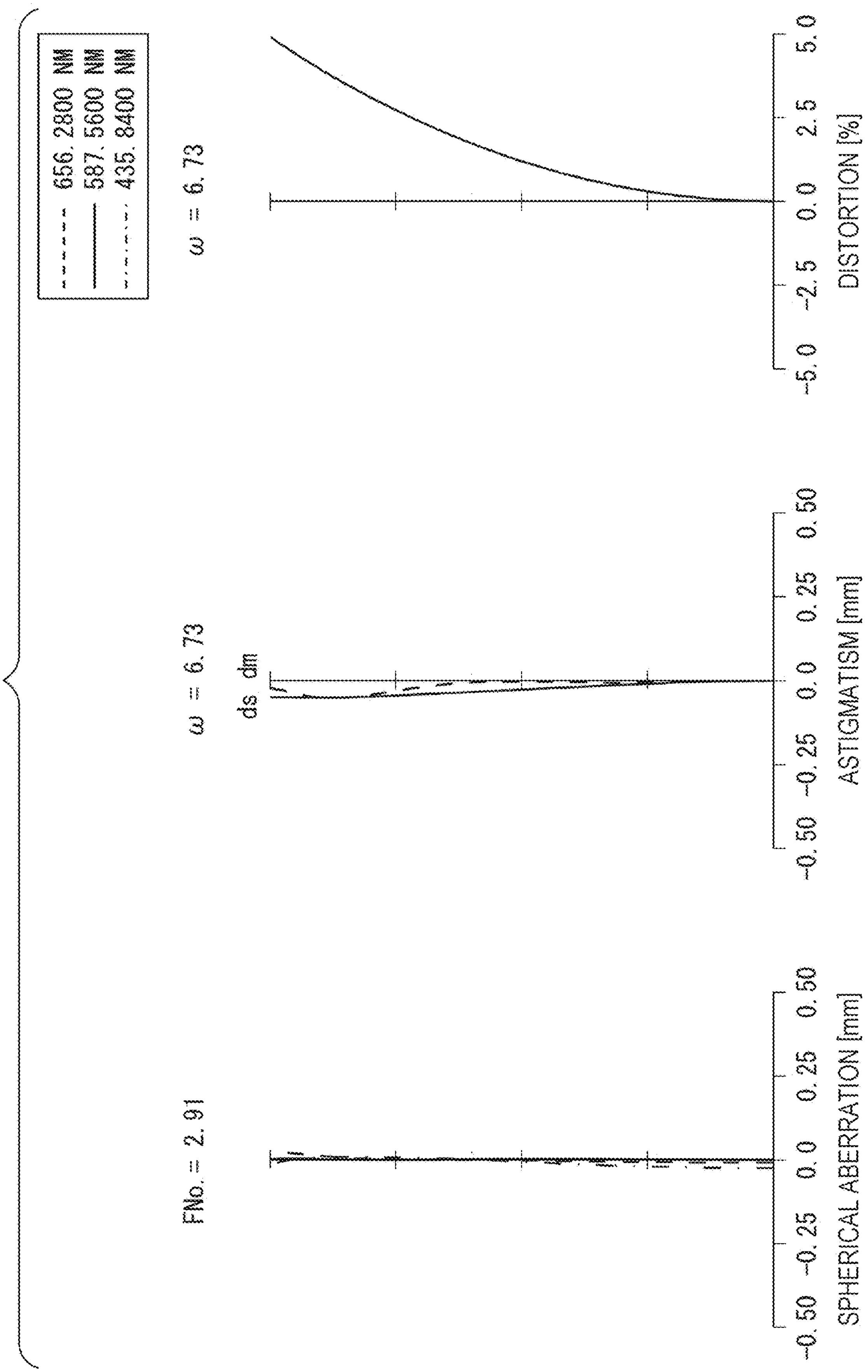
FIG. 8 illustrates a spherical aberration diagram, an astigmatism diagram, and a distortion diagram at the time of infinity focusing in a telephoto end state of the zoom lens of Example 2.

FIG. 5 is a view schematically illustrating an optical configuration of a zoom lens of Example 2 at the wide-angle end at the time of infinity focusing. The zoom lens of Example 2 is configured to include, in order from the object side, a first lens group G1 having the positive refractive power, a second lens group G2 having the negative refractive power, a third lens group G3 having the negative refractive power, a fourth lens group G4 having the positive refractive power, a fifth lens group G5 having the negative refractive power, and a sixth lens group G6 having the positive refractive power. The first lens group G1, the second lens group G2, and the third lens group G3 correspond to the above-described anterior group, and the fourth lens group G4, the fifth lens group G5, and the sixth lens group G6 correspond to the above-described posterior group. The first lens group G1 corresponds to the above-described lens group P. The second lens group G2 and the third lens group G3 correspond to the above-described middle group M1. In addition, the third lens group G3 corresponds to the above-described lens group N. The fourth lens group G4 corresponds to the above-described middle group M2. The fifth lens group G5 corresponds to the above-described lens group F. The sixth lens group G6 corresponds to the above-described rear-side group R.

An arrow in FIG. 5 represents a moving direction and a moving manner of each lens group in zooming from the wide-angle end to the telephoto end. As illustrated in FIG. 5, in zooming from the wide-angle end to the telephoto end, the first lens group G1 is gradually moved toward the object side, the second lens group G2 is gradually moved toward the image plane side, the third lens group G3 is gradually moved toward the image plane side, the fourth lens group G4 is moved along a convex trajectory toward the image plane side, and the fifth lens group G5 is moved along a convex trajectory toward the image plane side. The sixth lens group G6 is not moved.

In the zoom lens, the fifth lens group G5 is moved toward the image plane side to perform focusing from an infinite-distance object to a near object.

The aperture stop S is disposed adjacent to the object side of the fourth lens group G4.

Hereinafter, configurations of the lens groups will be described. The first lens group G1 is configured to include, in order from the object side, a cemented lens of a negative meniscus lens L1 and a biconvex lens L2 which both have convex surfaces facing the object side, and a positive meniscus lens L3 which has a convex surface facing the object side.

The second lens group G2 is configured to include, in order from the object side, a biconvex lens L4, a biconcave lens L5, a biconcave lens L6, and a positive meniscus lens L7 which has a convex surface facing the object side.

The third lens group G3 is configured of a negative meniscus lens L8 which has a concave surface facing the object side.

The fourth lens group G4 is configured to include, in order from the object side, a positive meniscus lens L9 which has a convex surface facing the object side, a positive meniscus lens L10 which has a convex surface facing the object side, a cemented lens in which three lenses of a negative meniscus lens L11 which has a convex surface facing the object side, a biconvex lens L12, and a biconcave lens L13 are cemented, a cemented lens of a positive meniscus lens L14 which has a concave surface facing the object side and a biconcave lens L15, and a biconvex lens L16. The biconvex lens L16 is a molded glass aspheric lens having both surfaces in an aspheric shape. Here, the cemented lens of the positive meniscus lens L14 and the biconcave lens L15 corresponds to the above-described vibration-compensation group V.

The fifth lens group G5 is configured of a cemented lens of a biconvex lens L17 and a biconcave lens L18.

The sixth lens group G6 is configured to include, in order from the object side, a biconvex lens L19, a plano-concave lens L20 which has a concave surface facing the image plane side, and a negative meniscus lens L21 which has a concave surface facing the object side. The plano-concave lens L20 is a molded glass aspheric lens having aspheric shapes on both surfaces.

Next, numerical-value examples to which specific numerical values of the zoom lens are applied will be described. Table 8 shows surface data of the zoom lens. In Table 8, Nos. 1 to 5 are surface numbers of the first lens group G1. Nos. 6 to 13 are surface numbers of the second lens group G2. Nos. 14 and 15 are surface numbers of the third lens group G3. Nos. 16 to 29 are surface numbers of the fourth lens group G4. Nos. 30 to 32 are surface numbers of the fourth lens group G4. Nos. 33 to 38 are surface numbers of the fourth lens group G4. Nos. 39 and 40 are surface numbers of the cover glass CG.

TABLE 7

| No. | r | d | nd | vd |
|---|---|---|---|---|
| Object surface | ∞ | d (0) | | |
| 1 | 155.3859 | 1.5000 | 1.80610 | 33.27 |
| 2 | 87.9098 | 7.0000 | 1.43700 | 95.10 |
| 3 | −19712.1002 | 0.2000 | | |
| 4 | 88.8134 | 6.6136 | 1.49700 | 81.61 |
| 5 | 1742.4292 | d (5) | | |
| 6 | 80.2347 | 3.8385 | 1.80610 | 33.27 |
| 7 | −299.2285 | 0.2000 | | |
| 8 | −1602.0549 | 1.1000 | 1.77250 | 49.60 |
| 9 | 31.8602 | 4.7478 | | |
| 10 | −244.3384 | 1.0000 | 1.61800 | 63.39 |
| 11 | 100.0350 | 0.2000 | | |
| 12 | 46.2756 | 3.3797 | 1.84666 | 23.78 |
| 13 | 150.3166 | d (13) | | |
| 14 | −44.2237 | 0.9000 | 1.87070 | 40.73 |
| 15 | −211.5283 | d (15) | | |
| 16 S | ∞ | 1.0000 | | |
| 17 | 39.6505 | 4.5135 | 1.72916 | 54.67 |
| 18 | 129.0097 | 0.2000 | | |

TABLE 7-continued

| No. | r | d | nd | vd |
|---|---|---|---|---|
| 19 | 33.5180 | 4.8373 | 1.49700 | 81.61 |
| 20 | 104.6825 | 1.2695 | | |
| 21 | 40.3280 | 1.2000 | 1.87070 | 40.73 |
| 22 | 17.7268 | 10.8384 | 1.61800 | 63.39 |
| 23 | −52.1009 | 1.2000 | 1.92119 | 23.96 |
| 24 | 70.7502 | 4.3238 | | |
| 25 | −107.9119 | 3.0681 | 1.91082 | 35.25 |
| 26 | −34.5861 | 0.8000 | 1.69680 | 55.46 |
| 27 | 71.1489 | 0.5000 | | |
| 28 ASPH | 30.8183 | 4.8708 | 1.85108 | 40.12 |
| 29 ASPH | −108.9359 | d (29) | | |
| 30 | 371.2133 | 3.2535 | 1.92286 | 20.88 |
| 31 | −37.0546 | 0.8000 | 1.83400 | 37.34 |
| 32 | 26.9939 | d (32) | | |
| 33 | 49.3332 | 5.2127 | 1.61772 | 49.81 |
| 34 | −70.0042 | 3.2154 | | |
| 35 ASPH | ∞ | 1.6000 | 1.58313 | 59.38 |
| 36 ASPH | 65.2278 | 6.6156 | | |
| 37 | −24.1077 | 1.3000 | 1.92286 | 20.88 |
| 38 | −34.8422 | d (38) | | |
| 39 | ∞ | 2.5000 | 1.51680 | 64.20 |
| 40 | ∞ | 1.0000 | | |
| Image plane | ∞ | | | |

Table 8 shows a specification table of the zoom lens of Example 2.

TABLE 8

| | Wide-angle end | Middle | Telephoto end |
|---|---|---|---|
| f | 72.0441 | 119.9950 | 174.6307 |
| FNo. | 2.9098 | 2.9097 | 2.9108 |
| ω | 16.5054 | 9.7412 | 6.7336 |
| Y | 21.6330 | 21.6330 | 21.6330 |

Table 9 shows distances of variable intervals at infinite-distance objects. Table 10 shows distances of the variable intervals at an imaging distance of 850 mm.

TABLE 9

| | Wide angle end | Middle | Telephoto end |
|---|---|---|---|
| d (0) | ∞ | ∞ | ∞ |
| d (5) | 2.9924 | 41.9190 | 59.8382 |
| d (13) | 7.3290 | 7.9924 | 8.4735 |
| d (15) | 27.6167 | 14.8554 | 3.0000 |
| d (29) | 3.2329 | 3.5018 | 2.5020 |
| d (32) | 12.4026 | 9.9675 | 12.7599 |
| d (38) | 23.6280 | 23.6280 | 23.6280 |

TABLE 10

| | Wide-angle end | Middle | Telephoto end |
|---|---|---|---|
| d (0) | 678.0000 | 653.3375 | 644.9999 |
| d (5) | 2.9924 | 41.9190 | 59.8382 |
| d (13) | 5.9986 | 5.9094 | 5.7351 |
| d (15) | 28.9471 | 16.9384 | 5.7384 |
| d (29) | 4.6487 | 7.7427 | 11.3729 |
| d (32) | 10.9868 | 5.7266 | 3.8891 |
| d (38) | 23.6280 | 23.6280 | 23.6280 |

Table 11 is a table showing focal lengths of the lens groups constituting the zoom lens according to Example 2.

TABLE 11

| Group No. | Focal length |
|---|---|
| G1 | 158.7770 |
| G2 | −140.1760 |
| G3 | −64.3774 |
| G4 | 34.9860 |
| G5 | −38.7204 |
| G6 | 234.6110 |

Table 12 shows aspheric coefficients of aspheric surfaces in the zoom lens of Example 2.

TABLE 12

| No. | k | A4 | A6 |
|---|---|---|---|
| 28 | 0.5351 | −9.88774E−06 | −2.81003E−09 |
| 29 | 0.0000 | 5.31930E−06 | −2.83356E−09 |
| 35 | 0.0000 | 1.81838E−05 | −4.20016E−08 |
| 36 | 0.0000 | 1.39207E−05 | −3.93743E−08 |

| No. | A8 | A10 | A12 |
|---|---|---|---|
| 28 | 7.79768E−12 | −4.31679E−14 | 0.00000E+00 |
| 29 | 1.59763E−11 | −4.15133E−14 | 0.00000E+00 |
| 35 | 2.38986E−10 | −1.92096E−13 | 0.00000E+00 |
| 36 | 1.91980E−10 | 4.26230E−14 | 0.00000E+00 |

Example 3

Figure 9:
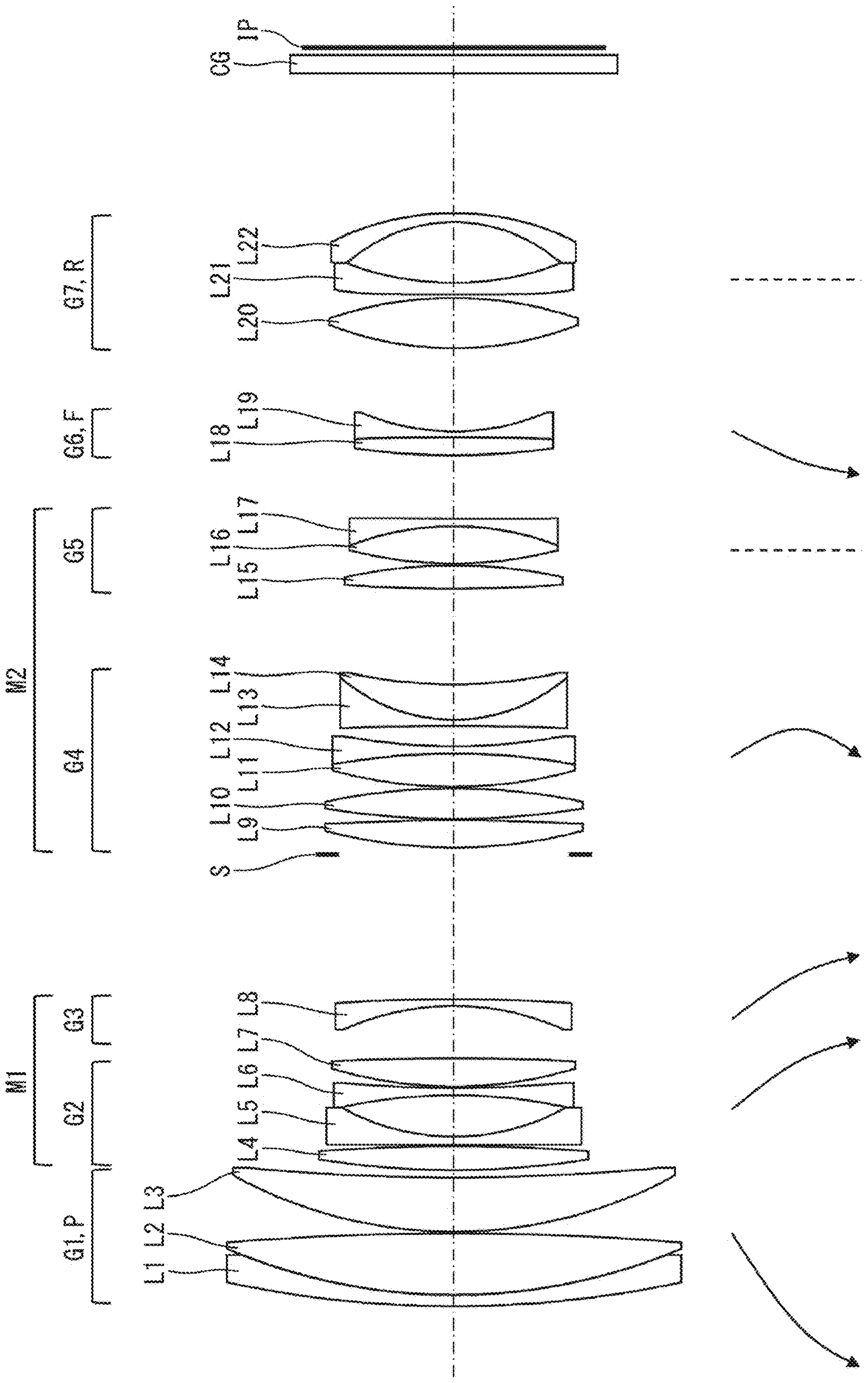
FIG. 9 is a lens cross-sectional view schematically illustrating an optical configuration at a wide-angle end of a zoom lens of Example 3.
Figure 10:
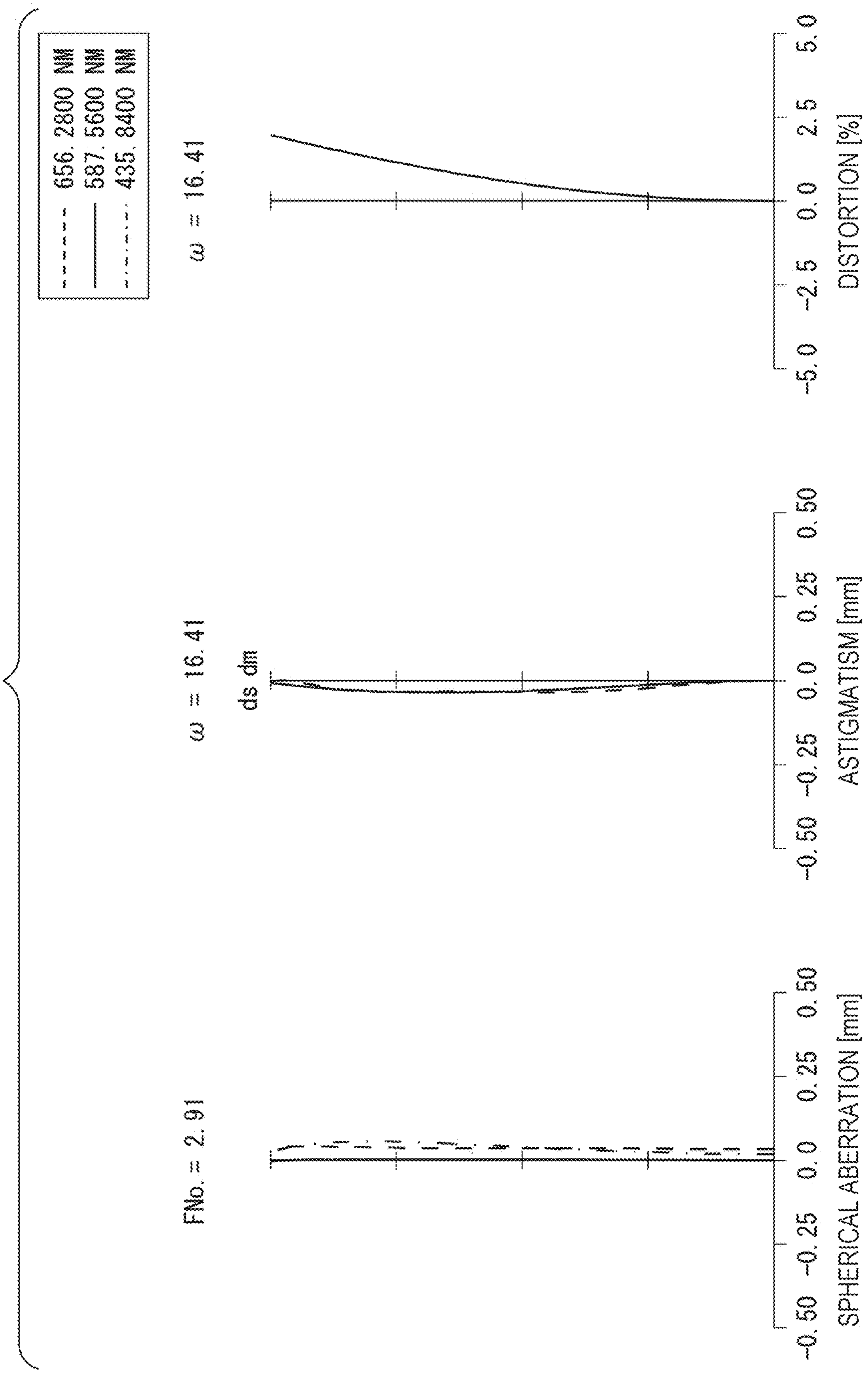
FIG. 10 illustrates a spherical aberration diagram, an astigmatism diagram, and a distortion diagram at the time of infinity focusing in a wide-angle end state of the zoom lens of Example 3.
Figure 11:
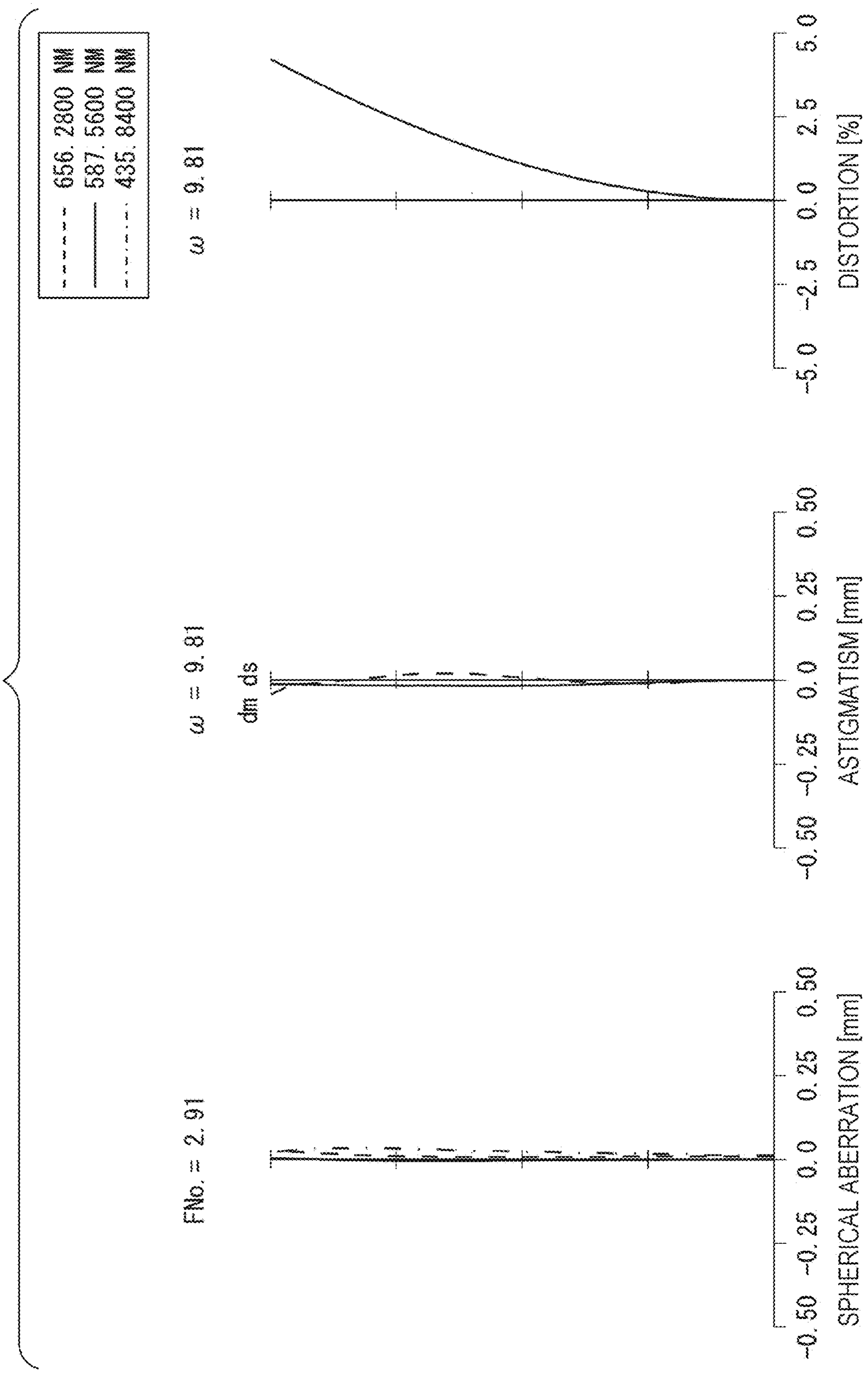
FIG. 11 illustrates a spherical aberration diagram, an astigmatism diagram, and a distortion diagram at the time of infinity focusing in an intermediate focal length state of the zoom lens of Example 3.
Figure 12:
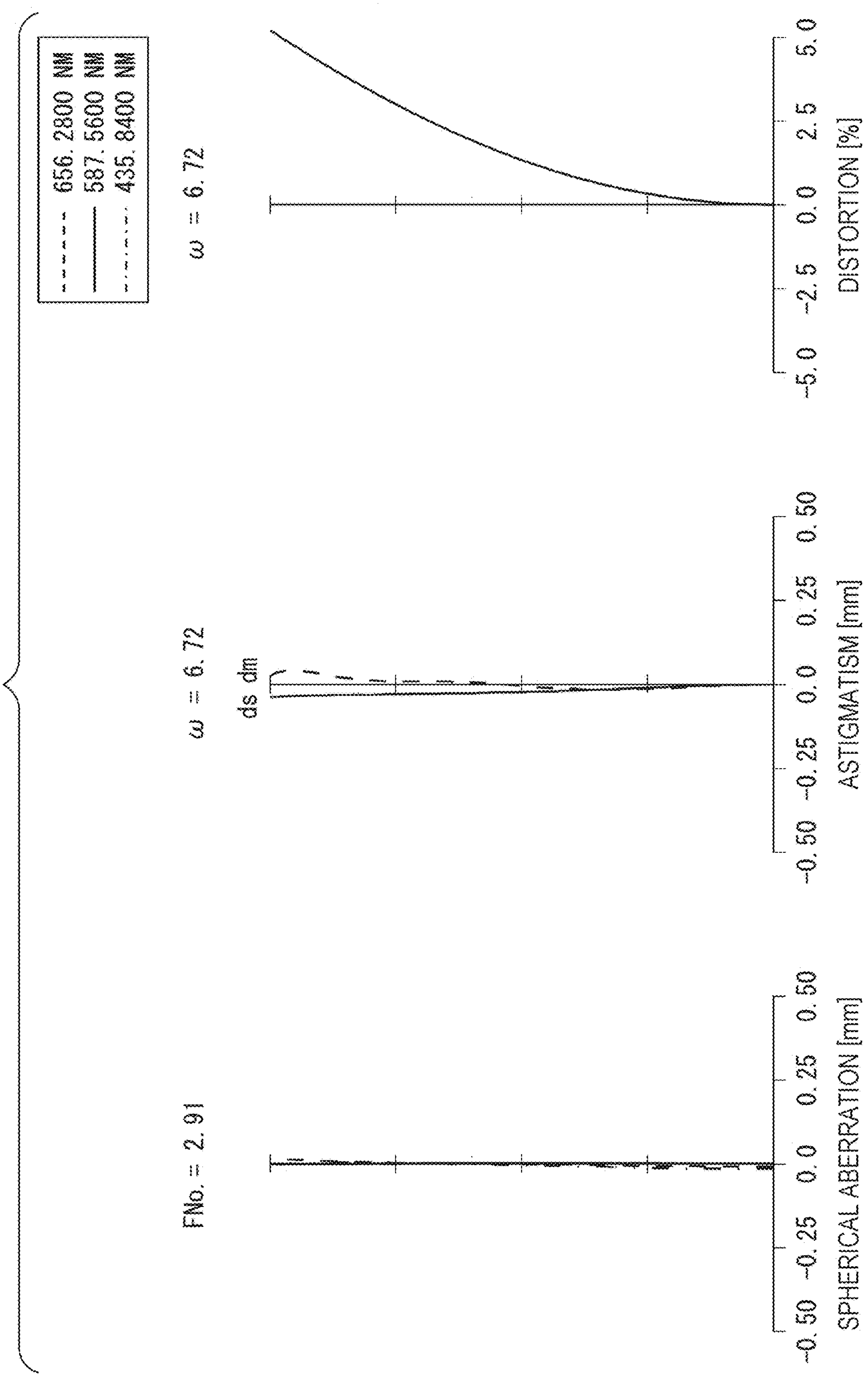
FIG. 12 illustrates a spherical aberration diagram, an astigmatism diagram, and a distortion diagram at the time of infinity focusing in a telephoto end state of the zoom lens of Example 3.

FIG. 9 is a view schematically illustrating an optical configuration of a zoom lens of Example 3 at the wide-angle end at the time of infinity focusing. The zoom lens of Example 3 is configured to include, in order from the object side, a first lens group G1 having the positive refractive power, a second lens group G2 having the negative refractive power, a third lens group G3 having the negative refractive power, a fourth lens group G4 having the positive refractive power, a fifth lens group G5 having the positive refractive power, a sixth lens group G6 having the negative refractive power, and a seventh lens group G7 having the positive refractive power. The first lens group G1, the second lens group G2, and the third lens group G3 correspond to the above-described anterior group, and the fourth lens group G4, the fifth lens group G5, the sixth lens group G6, and the seventh lens group G7 correspond to the above-described posterior group. The first lens group G1 corresponds to the above-described lens group P. The second lens group G2 and the third lens group G3 correspond to the above-described middle group M1. The third lens group G3 corresponds to the above-described lens group N. The fourth lens group G4 and the fifth lens group G5 correspond to the above-described middle group M2. The sixth lens group G6 corresponds to the above-described lens group F. The seventh lens group G7 corresponds to the above-described rear-side group R.

An arrow in FIG. 9 represents a moving direction and a moving manner of each lens group in zooming from the wide-angle end to the telephoto end. As illustrated in FIG. 9, in zooming from the wide-angle end to the telephoto end, the first lens group G1 is gradually moved toward the object side, the second lens group G2 is gradually moved toward the image plane side, the third lens group G3 is gradually moved toward the image plane side, the fourth lens group G4 is moved along a convex trajectory toward the image plane side, and the sixth lens group G6 is gradually moved toward the image plane side. The fifth lens group G5 and the seventh lens group G7 are not moved.

In the zoom lens, the sixth lens group G6 is moved toward the image plane side to perform focusing from an infinite-distance object to a near object.

The aperture stop S is disposed adjacent to the object side of the fourth lens group G4.

Hereinafter, configurations of the lens groups will be described. The first lens group G1 is configured to include, in order from the object side, a cemented lens of a negative meniscus lens L1 and a biconvex lens L2 which both have convex surfaces facing the object side, and a positive meniscus lens L3 which has a convex surface facing the object side.

The second lens group G2 is configured to include, in order from the object side, a biconvex lens L4, a concave lens L5 which has a convex surface facing the object side, a biconcave lens L6, and a biconvex lens L7.

The third lens group G3 is configured of a negative meniscus lens L8 which has a concave surface facing the object side.

The fourth lens group G4 is configured to include, in order from the object side, a biconvex lens L9, a biconvex lens L10, a cemented lens of a biconvex lens L11 and a biconcave lens L12, and a cemented lens of a biconcave lens L13 and a positive meniscus lens L14 which has a convex surface facing the object side. The biconvex lens L9 is a molded glass aspheric lens having both surfaces in an aspheric shape. Here, the cemented lens of the biconcave lens L13 and the positive meniscus lens L14 corresponds to the above-described vibration-compensation group V.

The fifth lens group G5 is configured to include, in order from the object side, a biconvex lens L15 and a cemented lens of a biconvex lens L16 and a biconcave lens L17.

The sixth lens group G6 is configured of a cemented lens of a biconvex lens L18 and a biconcave lens L19.

The seventh lens group G7 is configured to include, in order from the object side, a biconvex lens L20, a negative meniscus lens L21 which has a convex surface facing the object side, and a negative meniscus lens L22 which has a concave surface facing the object side. The negative meniscus lens L21 is a molded glass aspheric lens having aspheric shapes on both surfaces.

In Table 13, Nos. 1 to 5 are surface numbers of the first lens group G1. Nos. 6 to 13 are surface numbers of the second lens group G2. Nos. 14 and 15 are surface numbers of the third lens group G3. Nos. 16 to 26 are surface numbers of the fourth lens group G4. Nos. 27 to 31 are surface numbers of the fifth lens group G5. Nos. 32 to 34 are surface numbers of the sixth lens group G6. Nos. 35 to 40 are surface numbers of the seventh lens group G7. Nos. 41 and 42 are surface numbers of the cover glass CG.

TABLE 13

| No. | r | d | nd | νd |
|---|---|---|---|---|
| Object surface | ∞ | d (0) | | |
| 1 | 156.7990 | 1.5000 | 1.80610 | 33.27 |
| 2 | 82.1936 | 8.5000 | 1.43700 | 95.10 |
| 3 | −386.1731 | 0.2000 | | |
| 4 | 65.5052 | 7.3925 | 1.49700 | 81.61 |
| 5 | 325.2379 | d (5) | | |
| 6 | 118.8050 | 3.3068 | 1.80610 | 33.27 |
| 7 | −238.8145 | 0.2000 | | |
| 8 | 4543.2994 | 1.1000 | 1.77250 | 49.60 |
| 9 | 32.8014 | 5.5832 | | |
| 10 | −75.1944 | 1.0000 | 1.61800 | 63.39 |
| 11 | 167.3735 | 0.2000 | | |

TABLE 13-continued

| No. | r | d | nd | νd |
|---|---|---|---|---|
| 12 | 58.7908 | 3.8917 | 1.84666 | 23.78 |
| 13 | −359.8571 | d (13) | | |
| 14 | −38.3817 | 0.9000 | 1.87070 | 40.73 |
| 15 | −276.3938 | d (15) | | |
| 16 S | ∞ | 1.0000 | | |
| 17 | 73.6770 | 3.6741 | 1.77377 | 47.17 |
| 18 ASPH | −265.4944 | 0.2000 | | |
| 19 | 113.7271 | 4.1828 | 1.72916 | 54.67 |
| 20 | −89.9583 | 0.2000 | | |
| 21 | 63.4557 | 4.6037 | 1.49700 | 81.61 |
| 22 | −96.5853 | 1.0000 | 1.92119 | 23.96 |
| 23 | 92.4759 | 2.7000 | | |
| 24 | −452.4440 | 0.9000 | 1.73037 | 32.23 |
| 25 | 24.3720 | 4.8384 | 1.80518 | 25.46 |
| 26 | 72.9872 | d (26) | | |
| 27 | 198.0883 | 3.2572 | 1.91082 | 35.25 |
| 28 | −72.2124 | 0.2000 | | |
| 29 | 59.0048 | 5.1309 | 1.59282 | 68.62 |
| 30 | −41.1110 | 1.0000 | 1.90366 | 31.31 |
| 31 | 2451.2836 | d (31) | | |
| 32 | 98.9713 | 2.4397 | 1.92286 | 20.88 |
| 33 | −368.0850 | 0.8000 | 1.91082 | 35.25 |
| 34 | 33.6233 | d (34 ) | | |
| 35 | 47.9002 | 6.8564 | 1.62004 | 36.30 |
| 36 | −55.7782 | 0.5432 | | |
| 37 ASPH | 5000.0000 | 1.6000 | 1.51633 | 64.06 |
| 38 ASPH | 44.7227 | 8.1603 | | |
| 39 | −22.9749 | 1.3000 | 1.87070 | 40.73 |
| 40 | −38.7218 | d (40) | | |
| 41 | ∞ | 2.5000 | 1.51680 | 64.20 |
| 42 | ∞ | 1.0000 | | |
| Image plane | ∞ | | | |

Table 14 shows a specification table of the zoom lens of Example 3.

TABLE 14

| | Wide-angle end | Middle | Telephoto end |
|---|---|---|---|
| f | 72.0418 | 119.9846 | 174.6295 |
| FNO. | 2.9098 | 2.9096 | 2.9105 |
| ω | 16.4071 | 9.8135 | 6.7152 |
| Y | 21.6330 | 21.6330 | 21.6330 |

Table 15 shows distances of variable intervals at infinite-distance objects. Table 16 shows distances of the variable intervals at an imaging distance of 850 mm.

TABLE 15

| | Wide-angle end | Middle | Telephoto end |
|---|---|---|---|
| d (0) | ∞ | ∞ | ∞ |
| d (5) | 1.0000 | 34.7009 | 47.3048 |
| d (13) | 7.1477 | 7.8730 | 9.1476 |
| d (15) | 19.8051 | 13.9775 | 3.0000 |
| d (26) | 12.9935 | 7.5267 | 11.4940 |
| d (31) | 8.6903 | 4.1608 | 2.5033 |
| d (34) | 11.3837 | 15.9131 | 17.5706 |
| d (40) | 19.1188 | 19.1188 | 19.1188 |

TABLE 16

| | Wide-angle end | Middle | Telephoto end |
|---|---|---|---|
| d (0) | 678.0000 | 654.8683 | 648.0000 |
| d (5) | 1.0000 | 34.7009 | 47.3048 |
| d (13) | 5.3080 | 5.2064 | 5.0706 |
| d (15) | 21.6449 | 16.6441 | 7.0770 |

TABLE 16-continued

| | Wide-angle end | Middle | Telephoto end |
|---|---|---|---|
| d (26) | 12.9935 | 7.5267 | 11.4940 |
| d (31) | 10.5955 | 10.4743 | 16.1530 |
| d (34) | 9.4784 | 9.5996 | 3.9210 |
| d (40) | 19.1188 | 19.1188 | 19.1188 |

Table 17 is a table showing focal lengths of the lens groups constituting the zoom lens according to Example 3.

TABLE 17

| Group No. | Focal length |
|---|---|
| G1 | 127.0790 |
| G2 | −135.5110 |
| G3 | −51.2799 |
| G4 | 60.5976 |
| G5 | 50.2493 |
| G6 | −57.7848 |
| G7 | 1005.4200 |

Table 18 shows aspheric coefficients of aspheric surfaces in the zoom lens of Example 3.

TABLE 18

| No. | k | A4 | A6 |
|---|---|---|---|
| 18 | 0.0000 | 2.05238E−06 | 2.45175E−11 |
| 37 | 0.0000 | 3.38115E−06 | 2.09052E−09 |
| 38 | 0.0000 | 1.42791E−07 | 2.50957E−09 |
| **No.** | **A8** | **A10** | **A12** |
| 18 | 1.35807E−13 | −7.14210E−17 | 0.00000E+00 |
| 37 | 4.56355E−11 | 3.47790E−14 | 0.00000E+00 |
| 38 | −7.80453E−13 | 1.96116E−13 | 0.00000E+00 |

Example 4

Figure 13:
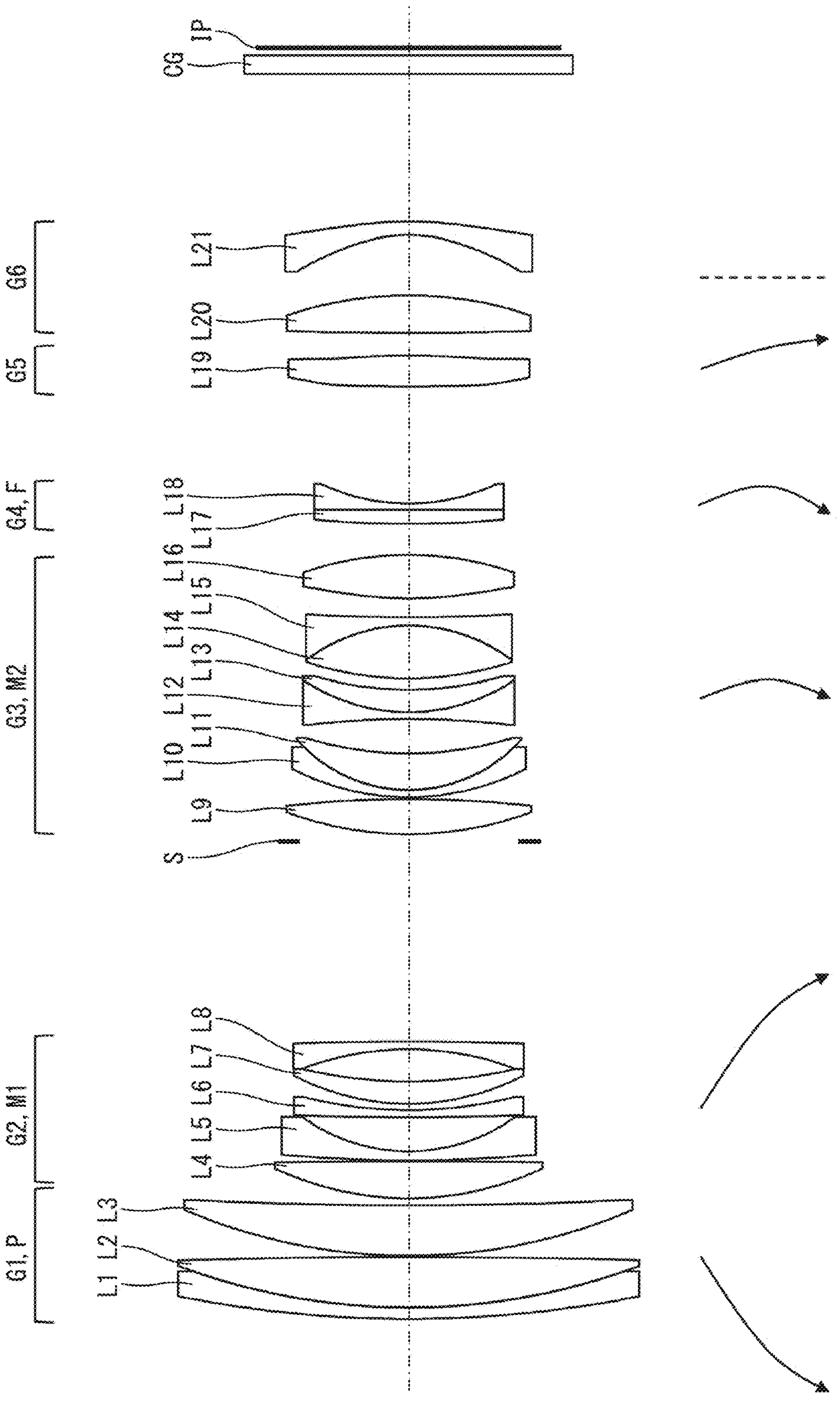
FIG. 13 is a lens cross-sectional view schematically illustrating an optical configuration at a wide-angle end of a zoom lens of Example 4.
Figure 14:
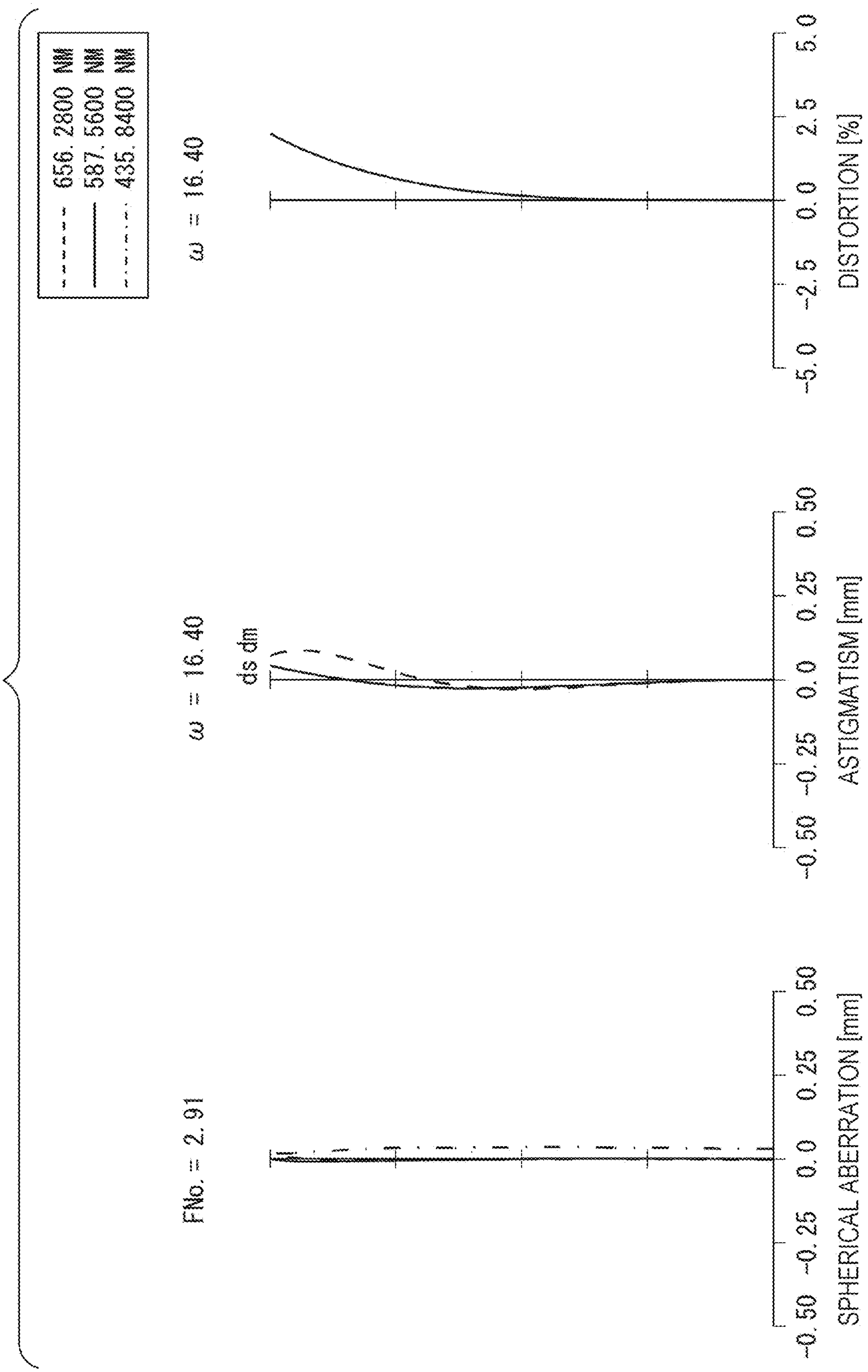
FIG. 14 illustrates a spherical aberration diagram, an astigmatism diagram, and a distortion diagram at the time of infinity focusing in a wide-angle end state of the zoom lens of Example 4.
Figure 15:
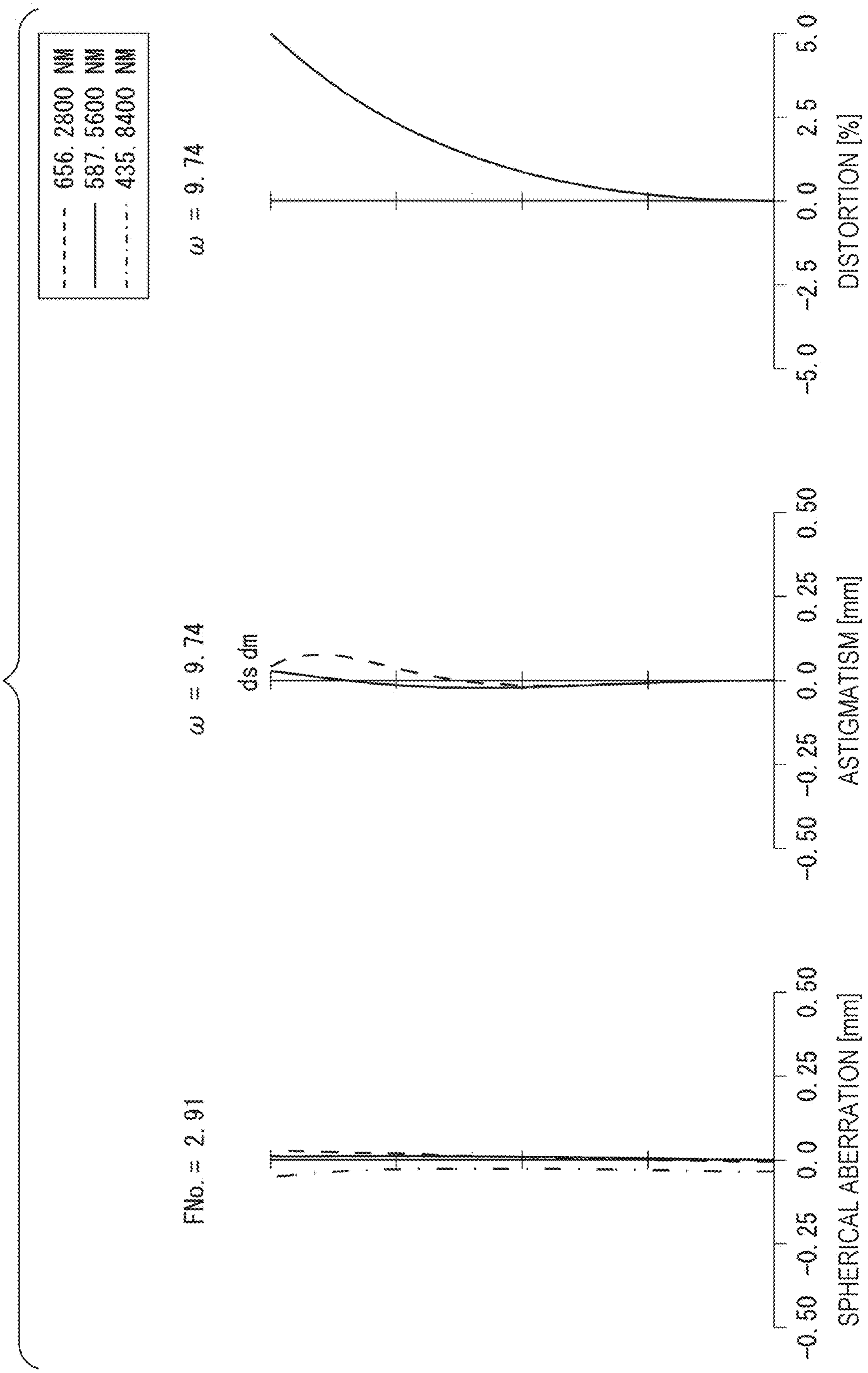
FIG. 15 illustrates a spherical aberration diagram, an astigmatism diagram, and a distortion diagram at the time of infinity focusing in an intermediate focal length state of the zoom lens of Example 4.
Figure 16:
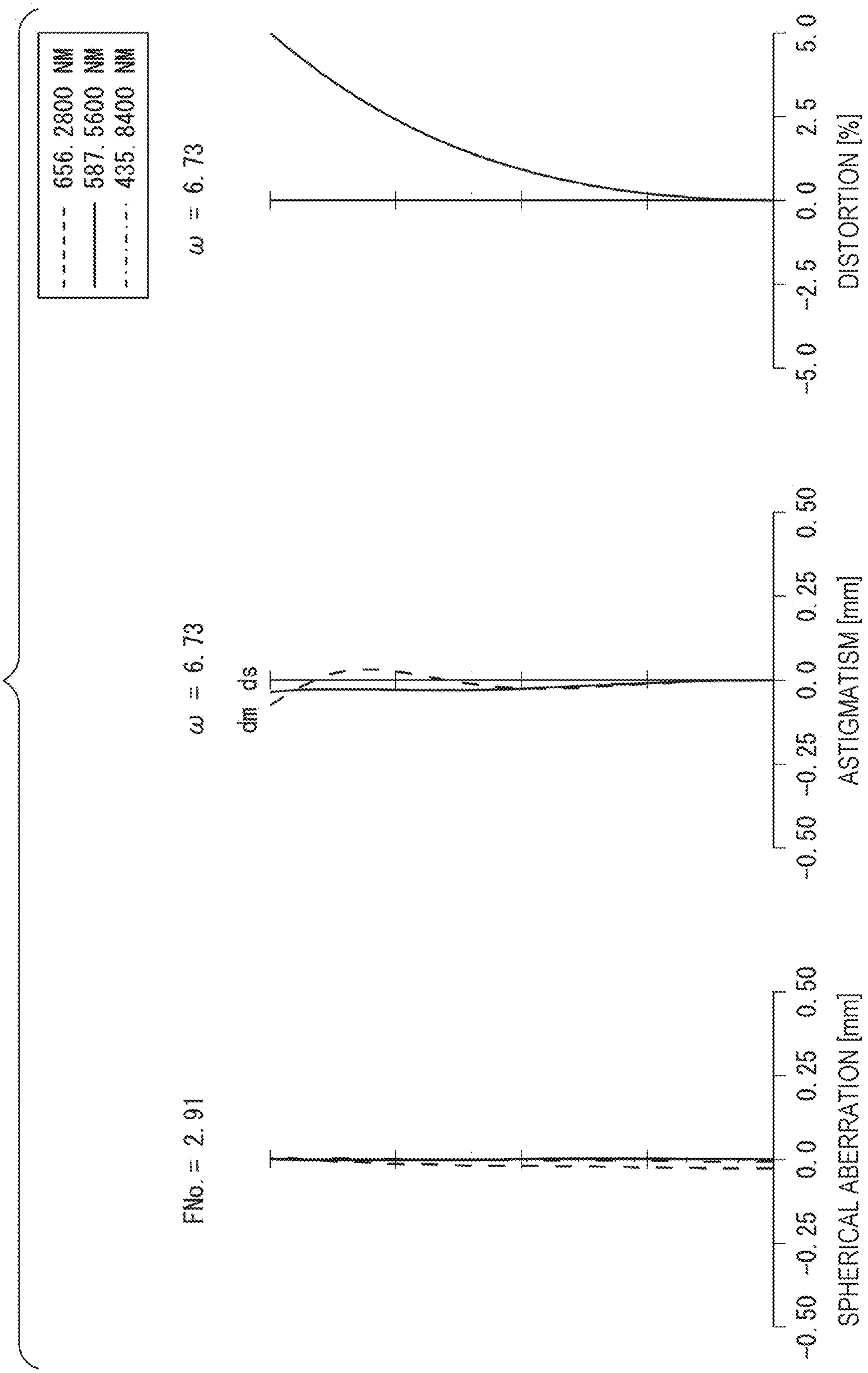
FIG. 16 illustrates a spherical aberration diagram, an astigmatism diagram, and a distortion diagram at the time of infinity focusing in a telephoto end state of the zoom lens of Example 4.

FIG. 13 is a view schematically illustrating an optical configuration of a zoom lens of Example 4 at the wide-angle end at the time of infinity focusing. The zoom lens of Example 4 is configured to include, in order from the object side, a first lens group G1 having the positive refractive power, a second lens group G2 having the negative refractive power, a third lens group G3 having the positive refractive power, a fourth lens group G4 having the negative refractive power, a fifth lens group G5 having the positive refractive power, and a sixth lens group G6 having the negative refractive power. The first lens group G1 and the second lens group G2 correspond to the above-described anterior group, and the third lens group G3, the fourth lens group G4, the fifth lens group G5, and the sixth lens group G6 correspond to the above-described posterior group. The first lens group G1 corresponds to the above-described lens group P. The second lens group G2 corresponds to the above-described middle group M1. The second lens group G2 corresponds to the above-described lens group N. The third lens group G3 corresponds to the above-described middle group M2. The fourth lens group G4 corresponds to the above-described lens group F. The fifth lens group G5 and the sixth lens group G6 correspond to the above-described rear-side group R.

An arrow in FIG. 13 represents a moving direction and a moving manner of each lens group in zooming from the wide-angle end to the telephoto end. As illustrated in FIG. 13, in zooming from the wide-angle end to the telephoto end, the first lens group G1 is gradually moved toward the object side, the second lens group G2 is gradually moved toward the image plane side, the third lens group G3 is moved along a convex trajectory toward the image plane side, the fourth lens group G4 is moved along a convex trajectory toward the image plane side, and the fifth lens group G5 is gradually moved toward the image plane side. The sixth lens group G6 is not moved.

In the zoom lens, the fourth lens group G4 is moved toward the image plane side to perform focusing from an infinite-distance object to a near object.

An aperture stop S is disposed adjacent to the object side of the third lens group G3.

Hereinafter, configurations of the lens groups will be described. The first lens group G1 is configured to include, in order from the object side, a cemented lens of a negative meniscus lens L1 and a biconvex lens L2 which both have convex surfaces facing the object side, and a positive meniscus lens L3 which has a convex surface facing the object side.

The second lens group G2 is configured to include, in order from the object side, a biconvex lens L4, a negative meniscus lens L5 which has a convex surface facing the object side, a negative meniscus lens L6 which has a convex surface facing the object side, a positive meniscus lens L7 which has a convex surface facing the object side, and a negative meniscus lens L8 which has a concave surface facing the object side.

The third lens group G3 is configured to include, in order from the object side, a biconvex lens L9, a cemented lens of a negative meniscus lens L10 which has a convex surface facing the object side and a positive meniscus lens L11 which has a convex surface facing the object side, a cemented lens of a biconcave lens L12 and a positive meniscus lens L13 which has a convex surface facing the object side, a cemented lens of a biconvex lens L14 and a biconcave lens L15, and a biconvex lens L16. Here, the cemented lens of the biconcave lens L12 and the positive meniscus lens L13 corresponds to the above-described vibration-compensation group V. The biconvex lens L16 is a molded glass aspheric lens having both surfaces in an aspheric shape.

The fourth lens group G4 is configured of a cemented lens of a biconvex lens L17 and a biconcave lens L18.

The fifth lens group G5 is configured to include a biconvex lens L19. The biconvex lens L19 is a molded glass aspheric lens having both surfaces in an aspheric shape.

The sixth lens group G6 is configured to include, in order from the object side, a biconvex lens L20 and a negative meniscus lens L21 which has a concave surface facing the object side. The negative meniscus lens L21 is a molded glass aspheric lens having aspheric shapes on both surfaces.

In Table 19, Nos. 1 to 5 are surface numbers of the first lens group G1. Nos. 6 to 15 are surface numbers of the second lens group G2. Nos. 16 to 29 are surface numbers of the third lens group G3. Nos. 30 to 32 are surface numbers of the fourth lens group G4. Nos. 33 to 34 are surface numbers of the fifth lens group G5. Nos. 35 to 38 are surface numbers of the sixth lens group G6. Nos. 39 and 40 are surface numbers of the cover glass CG.

TABLE 19

| No. | r | d | nd | νd |
|---|---|---|---|---|
| Object surface | ∞ | d (0) | | |
| 1 | 171.9650 | 1.5000 | 1.80610 | 33.27 |
| 2 | 93.1291 | 6.8201 | 1.49700 | 81.61 |
| 3 | −1483.9550 | 0.2000 | | |
| 4 | 80.4637 | 6.8272 | 1.43700 | 95.10 |
| 5 | 622.0322 | d (5) | | |
| 6 | 45.2633 | 4.9255 | 1.72047 | 34.71 |
| 7 | −2246.0592 | 0.2000 | | |
| 8 | 218.4195 | 1.2000 | 1.75500 | 52.32 |
| 9 | 25.8982 | 4.5749 | | |
| 10 | 423.8887 | 1.0000 | 1.65160 | 58.54 |
| 11 | 61.1858 | 0.8585 | | |
| 12 | 35.3924 | 2.9693 | 1.92119 | 23.96 |
| 13 | 64.2551 | 4.3570 | | |
| 14 | −43.3331 | 1.1000 | 1.90043 | 37.37 |
| 15 | −443.4062 | d (15) | | |
| 16 S | ∞ | 1.0000 | | |
| 17 | 49.3230 | 4.8151 | 1.72916 | 54.67 |
| 18 | −156.5041 | 0.2000 | | |
| 19 | 35.8156 | 1.0000 | 1.85451 | 25.15 |
| 20 | 21.2043 | 4.9420 | 1.59282 | 68.62 |
| 21 | 51.5391 | 4.6542 | | |
| 22 | −124.3630 | 0.9000 | 1.65412 | 39.68 |
| 23 | 26.9786 | 3.0622 | 1.92119 | 23.96 |
| 24 | 47.4703 | 1.5000 | | |
| 25 | 46.6724 | 7.1903 | 1.59282 | 68.62 |
| 26 | −24.0601 | 1.1000 | 1.91082 | 35.25 |
| 27 | 274.6914 | 2.5464 | | |
| 28 ASPH | 55.2152 | 5.8899 | 1.85108 | 40.12 |
| 29 ASPH | −46.4995 | d (29) | | |
| 30 | 142.4900 | 1.9607 | 1.92286 | 20.88 |
| 31 | −2722.4094 | 0.8000 | 1.75500 | 52.32 |
| 32 | 29.9088 | d (32) | | |
| 33 ASPH | 1000.0000 | 4.2000 | 1.58313 | 59.38 |
| 34 ASPH | −95.7047 | d (34) | | |
| 35 | 833.2418 | 5.0000 | 1.58144 | 40.75 |
| 36 | −53.6976 | 8.1620 | | |
| 37 ASPH | −20.3984 | 1.8000 | 1.85108 | 40.12 |
| 38 ASPH | −47.8222 | d (38) | | |
| 39 | ∞ | 2.5000 | 1.51680 | 64.20 |
| 40 | ∞ | 1.0000 | | |
| Image plane | ∞ | | | |

Table 20 shows a specification table of the zoom lens of Example 4.

TABLE 20

| | Wide-angle end | Middle | Telephoto end |
|---|---|---|---|
| f | 72.0452 | 120.0092 | 174.6309 |
| FNO. | 2.9097 | 2.9103 | 2.9097 |
| ω | 16.4017 | 9.7407 | 6.7277 |
| Y | 21.6330 | 21.6330 | 21.6330 |

Table 21 shows distances of variable intervals at infinite-distance objects. Table 22 shows distances of the variable intervals at an imaging distance of 850 mm.

TABLE 21

| | Wide-angle end | Middle | Telephoto end |
|---|---|---|---|
| d (0) | ∞ | ∞ | ∞ |
| d (5) | 1.0000 | 39.4216 | 56.4036 |
| d (15) | 27.0392 | 13.7802 | 2.0000 |
| d (29) | 4.2380 | 4.8393 | 2.5023 |
| d (32) | 15.8160 | 13.8347 | 19.3171 |
| d (34) | 3.1299 | 1.2664 | 1.0000 |
| d (38) | 20.0217 | 20.0217 | 20.0217 |

TABLE 22

| | Wide-angle end | Middle | Telephoto end |
|---|---|---|---|
| d (0) | 678.0000 | 656.0808 | 648.0000 |
| d (5) | 1.0000 | 39.4216 | 56.4036 |
| d (15) | 27.0392 | 13.7802 | 2.0000 |
| d (29) | 6.6076 | 11.6942 | 15.9665 |
| d (32) | 13.4464 | 6.9798 | 5.8530 |
| d (34) | 3.1299 | 1.2664 | 1.0000 |
| d (38) | 20.0217 | 20.0217 | 20.0217 |

Table 23 is a table showing focal lengths of the lens groups constituting the zoom lens according to Example 4.

TABLE 23

| Group No. | Focal length |
|---|---|
| G1 | 155.8780 |
| G2 | −42.2798 |
| G3 | 36.4842 |
| G4 | −54.1607 |
| G5 | 150.0000 |
| G6 | −103.3940 |

Table 24 shows aspheric coefficients of aspheric surfaces in the zoom lens of Example 4.

TABLE 24

| No. | k | A4 | A6 |
|---|---|---|---|
| 28 | 0.0000 | −7.55407E−06 | 3.96744E−10 |
| 29 | 0.0000 | 1.09067E−06 | −5.52850E−09 |
| 33 | 0.0000 | 1.76477E−05 | −1.32309E−08 |
| 34 | 0.0000 | 1.57694E−05 | −9.35953E−09 |
| 37 | 0.0000 | 4.54689E−05 | −5.99527E−08 |
| 38 | 0.0000 | 2.75334E−05 | −6.79104E−08 |

| No. | A8 | A10 | A12 |
|---|---|---|---|
| 28 | −1.82657E−11 | 4.77371E−14 | 0.00000E+00 |
| 29 | −1.25618E−11 | 3.79100E−14 | 0.00000E+00 |
| 33 | 1.09732E−10 | −3.97701E−13 | 0.00000E+00 |
| 34 | 1.23267E−10 | −5.07279E−13 | 0.00000E+00 |
| 37 | 1.64503E−10 | −1.85355E−13 | 0.00000E+00 |
| 38 | 1.30590E−10 | −1.61915E−13 | 0.00000E+00 |

Table 25 shows calculated values according to the above-described expressions in Examples 1 to 4 and numerical values used in the expressions.

TABLE 25

| | | Example 1 | Example 2 | Example 3 | Example 4 |
|---|---|---|---|---|---|
| Conditional Expression (1) | bfw/Yw | 0.921 | 1.215 | 1.006 | 1.048 |
| Conditional Expression (2) | fp/ft | 0.848 | 0.909 | 0.728 | 0.893 |
| Conditional Expression (3) | fm1/fw | −0.568 | −0.577 | −0.468 | −0.587 |
| Conditional Expression (4) | Dm/Tw | 0.164 | 0.167 | 0.122 | 0.164 |
| Conditional Expression (5) | \|Xp\|/\|Xn\| | 1.022 | 1.321 | 1.639 | 1.181 |
| Conditional Expression (6) | $\{1 - (\beta\ ft)^2\} \times (\beta rt)^2$ | 3.300 | 3.925 | 2.394 | 3.143 |
| Conditional Expression (7) | fm2p/fm2 | 1.418 | 1.569 | 1.116 | 1.312 |
| Conditional Expression (8) | fm2v/fm2 | −1.909 | −2.361 | −2.667 | −1.871 |

The numerical values used in the above-described expressions in Examples 1 to 4 are shown in Table 26.

TABLE 26

| | Example 1 | Example 2 | Example 3 | Example 4 |
|---|---|---|---|---|
| bfw | 19.929 | 26.276 | 21.767 | 22.670 |
| fp | 148.101 | 158.777 | 127.079 | 155.878 |
| fm1 | −40.909 | −41.597 | −33.729 | −42.280 |
| Dm | 28.130 | 28.617 | 20.805 | 28.039 |
| Tw | 171.148 | 171.148 | 171.148 | 171.148 |
| \|Xp\| | 25.868 | 33.000 | 30.000 | 30.000 |
| \|Xn\| | 25.314 | 24.990 | 18.305 | 25.404 |
| β ft | 2.485 | 3.068 | 2.196 | 2.261 |
| βrt | 0.799 | 0.683 | 0.791 | 0.874 |
| fm2p | 50.819 | 54.898 | 43.879 | 47.858 |
| fm2 | 35.842 | 34.986 | 39.303 | 36.484 |
| fm2v | −68.432 | −82.612 | −104.820 | −68.266 |

What is claimed is:

1. A zoom lens comprising:

a plurality of lens groups, wherein, when a lens group disposed on an object side from a widest air interval between lens groups at a wide-angle end is defined as an anterior group, and a lens group disposed on an image plane side from the air interval is defined as a posterior group, the anterior group is configured to include, in order from the object side, a lens group P having positive refractive power and a middle group M1 including one or more lens groups and having negative refractive power as a whole, and has negative refractive power as a whole, and the posterior group is configured to include, in order from the object side, a middle group M2 including one or more lens groups and having positive refractive power as a whole, a lens group F having negative refractive power as a whole, and a rear-side group R including one or more lens groups, and has positive refractive power as a whole, in zooming from the wide-angle end to a telephoto end, an interval between adjacent lens groups changes, five or less lens groups are moved to change intervals between adjacent lens groups, the lens group P is moved toward the object side, at least one lens group having the negative refractive power of the lens groups included in the middle group M1 is gradually moved toward the image plane side, and at least one lens group having positive refractive power of the lens groups included in the middle group M2 is moved along a convex trajectory toward the image plane side, the lens group F is moved along an optical axis of the zoom lens at a time of focusing, following conditions are satisfied:

$$0.5 \leq bfw/Yw \leq 1.4 \quad (1)$$

$$0.5 \leq fp/ft \leq 1.5 \quad (2)$$

$$-0.9 \leq fm1/fw \leq -0.15 \quad (3)$$

where bfw is back focus of an optical system of the zoom lens at the wide-angle end, Yw is a maximum image height at the wide-angle end, fp is a focal length of the lens group P, ft is a focal length of an optical system of the zoom lens at the telephoto end, fm1 is a combined focal length of the middle group M1 at the wide-angle end, and fw is a focal length of the optical system of the zoom lens at the wide-angle end, and the middle group M1 includes a positive lens located closest to an object.

2. The zoom lens according to claim 1, wherein a following condition is satisfied:

$$0.05 \leq Dm/Tw \leq 0.20 \quad (4)$$

where

Dm is a distance between the middle group M1 and the middle group M2 on the optical axis at the wide-angle end, and Tw is a total optical length at the wide-angle end.

3. The zoom lens according to claim 1, wherein, when a lens group N is defined as a lens group having a highest negative refractive power, of the lens groups having negative refractive power included in the middle group M1, a following condition is satisfied:

$$0.5 \leq |Xp|/|Xn| \leq 2.0 \quad (5)$$

where

Xp is a distance between a position of the lens group P at the wide-angle end and a position of the lens group P at the telephoto end on the optical axis, and Xn is a distance between a position of the lens group N at the wide-angle end and a position of the lens group N at the telephoto end on the optical axis.

4. The zoom lens according to claim 1, wherein a following condition is satisfied:

$$1.5 \leq \left|\left\{1-(\beta ft)^2\right\} \times (\beta rt)^2\right| \leq 9.5 \quad (6)$$

where

βft is a lateral magnification of the lens group F at the telephoto end at a time of infinity focusing, and βrt is a lateral magnification of the rear-side group R at the telephoto end at the time of infinity focusing.

5. The zoom lens according to claim 1, wherein, in zooming from the wide-angle end to the telephoto end, the lens group F is moved along a convex trajectory toward the image plane side.

6. The zoom lens according to claim 1, wherein the middle group M2 includes a vibration-compensation group V having negative refractive power and moving in a direction orthogonal to the optical axis.

7. The zoom lens according to claim 6, wherein the middle group M2 includes one or more lenses on the object side from the vibration-compensation group V and on the image plane side from the vibration-compensation group V, and the lenses disposed on the object side from the vibration-compensation group V in the middle group M2 have positive refractive power as a whole, and the lenses disposed on the image plane side from the vibration-compensation group V in the middle group M2 have positive refractive power as a whole.

8. The zoom lens according to claim 7, wherein a following condition is satisfied:

$$0.7 \leq fm2p/fm2 \leq 2.0 \quad (7)$$

where fm2p is a combined focal length at the telephoto end of all the lenses arranged on the object side from the vibration-compensation group V in the middle group M2, and fm2 is a combined focal length of the middle group M2 at the telephoto end.

9. The zoom lens according to claim 7, wherein a following condition is satisfied:

$$-3.3 \leq fm2v/fm2 \leq -1.2 \quad (8)$$

where fm2v is a focal length of the vibration-compensation group V, and fm2 is a combined focal length of the middle group M2 at the telephoto end.

10. The zoom lens according to claim 1, wherein the lens group F includes at least one lens having positive refractive power and at least one lens having negative refractive power.

11. An imaging apparatus comprising:

the zoom lens according to claim 1; and an image sensor that converts an optical image formed by the zoom lens into an electrical signal on an image plane side of the zoom lens.

12. A zoom lens comprising:

a plurality of lens groups, wherein, when a lens group disposed on an object side from a widest air interval between lens groups at a wide-angle end is defined as an anterior group, and a lens group disposed on an image plane side from the air interval is defined as a posterior group, the anterior group is configured to include, in order from the object side, a lens group P having positive refractive power and a middle group M1 including one or more lens groups and having negative refractive power as a whole, and has negative refractive power as a whole, and the posterior group is configured to include, in order from the object side, a middle group M2 including one or more lens groups and having positive refractive power as a whole, a lens group F having negative refractive power as a whole, and a rear-side group R including one or more lens groups, and has positive refractive power as a whole, in zooming from the wide-angle end to a telephoto end, an interval between adjacent lens groups changes, five or less lens groups are moved to change intervals between adjacent lens groups, the lens group P is moved toward the object side, at least one lens group having the negative refractive power of the lens groups included in the middle group M1 is gradually moved toward the image plane side, and at least one lens group having positive refractive power of the lens groups included in the middle group M2 is moved along a convex trajectory toward the image plane side, the lens group F is moved along an optical axis of the zoom lens at a time of focusing, following conditions are satisfied:

$$0.5 \leq bfw/Yw \leq 1.4 \quad (1)$$

$$0.5 \leq fp/ft \leq 1.5 \quad (2)$$

$$-0.9 \leq fm1/fw \leq -0.15 \quad (3)$$

where bfw is back focus of an optical system of the zoom lens at the wide-angle end, Yw is a maximum image height at the wide-angle end, fp is a focal length of the lens group P, ft is a focal length of an optical system of the zoom lens at the telephoto end, fm1 is a combined focal length of the middle group M1 at the wide-angle end, and fw is a focal length of the optical system of the zoom lens at the wide-angle end, and wherein the middle group M2 includes a vibration-compensation group V having negative refractive power and moving in a direction orthogonal to the optical axis.

* * * * *